United States Patent
Yokota

(10) Patent No.: US 8,509,452 B2
(45) Date of Patent: Aug. 13, 2013

(54) NOISE REDUCTION APPARATUS AND AUDIO REPRODUCTION APPARATUS

(75) Inventor: Teppei Yokota, Chiba (JP)

(73) Assignee: Sony Corporation, Tokyo (JP)

( * ) Notice: Subject to any disclaimer, the term of this patent is extended or adjusted under 35 U.S.C. 154(b) by 1058 days.

(21) Appl. No.: 12/080,902

(22) Filed: Apr. 7, 2008

(65) Prior Publication Data

US 2008/0260174 A1 Oct. 23, 2008

(30) Foreign Application Priority Data

Apr. 19, 2007 (JP) ................................. 2007-110005

(51) Int. Cl.
*G10K 11/175* (2006.01)
(52) U.S. Cl.
USPC .......................................... 381/71.4; 381/71.6
(58) Field of Classification Search
USPC .............................. 381/74.1, 71.2, 71.4, 71.6
See application file for complete search history.

(56) References Cited

U.S. PATENT DOCUMENTS

| | | | | |
|---|---|---|---|---|
| 5,568,557 A * | 10/1996 | Ross et al. | .................. | 381/71.11 |
| 6,343,127 B1 * | 1/2002 | Billoud | ......................... | 381/71.4 |
| 7,020,288 B1 * | 3/2006 | Ohashi | ......................... | 381/71.4 |
| 7,162,048 B2 * | 1/2007 | Shima | ........................... | 381/334 |
| 2001/0031052 A1 * | 10/2001 | Lock et al. | .................... | 381/71.7 |
| 2001/0036280 A1 * | 11/2001 | Astorino et al. | ............. | 381/71.4 |
| 2002/0076059 A1 * | 6/2002 | Joynes | .......................... | 381/71.6 |
| 2006/0269068 A1 * | 11/2006 | Yokota | .............................. | 381/1 |
| 2009/0279709 A1 | 11/2009 | Asada et al. | | |

FOREIGN PATENT DOCUMENTS

| | | |
|---|---|---|
| CN | 2602571 A | 2/2004 |
| JP | 02-228195 A | 9/1990 |
| JP | 06-175670 A | 6/1994 |
| JP | 07-020882 A | 1/1995 |
| JP | 08-123433 A | 5/1996 |
| JP | 08-123438 A | 5/1996 |
| JP | 2778173 | 8/1998 |
| JP | 2003-087899 A | 3/2003 |
| JP | 2006-270302 A | 10/2006 |
| JP | 2007-003994 A | 1/2007 |
| JP | 2007-028354 A | 2/2007 |

OTHER PUBLICATIONS

Wikipedia Page for Loudspeaker Enclosure, http://en.wikipedia.org/wiki/Loudspeaker_enclosure, accessed Feb. 13, 2012.*

* cited by examiner

*Primary Examiner* — Jeremy Luks
(74) *Attorney, Agent, or Firm* — Wolf, Greenfield & Sacks, P.C.

(57) ABSTRACT

A noise reduction apparatus includes: a speaker with a speaker unit held by holding means to make it possible to mix sounds emitted from front and rear of a vibration plate of the speaker; a microphone provided in an area where the sounds emitted from the front and rear of the vibration plate of the speaker are mixed and cancelled; and means for supplying a noise reduction audio signal obtained by phase-inverting an audio signal collected by the microphone to the speaker.

12 Claims, 14 Drawing Sheets

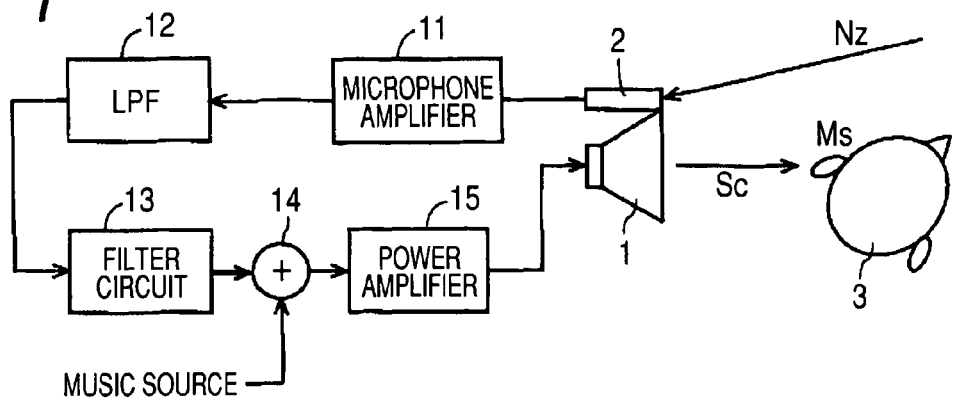
FIG. 1
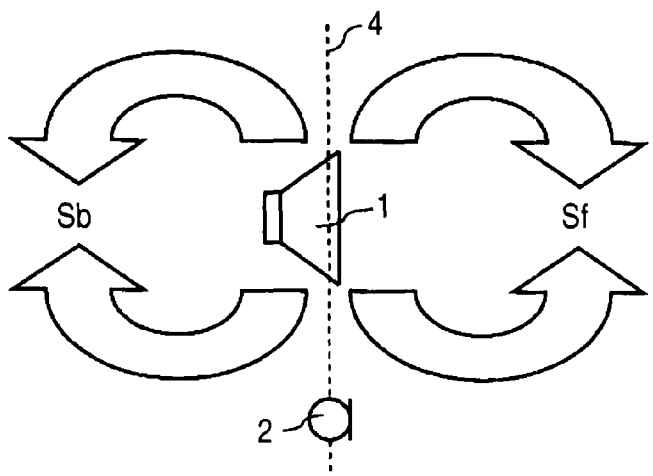
FIG. 2
FIG. 3A
FIG. 3B
FIG. 3C

RELATION BETWEEN DISTANCE AND SOUND PRESSURE
(17 cm CONE TYPE)

NOISE REDUCTION APPARATUS AND AUDIO REPRODUCTION APPARATUS

CROSS-REFERENCES TO RELATED APPLICATIONS

The present invention contains subject matter related to Japanese Patent Application JP 2007-110005 filed in the Japanese Patent Office on Apr. 19, 2007, the entire contents of which being incorporated herein by reference.

BACKGROUND OF THE INVENTION

1. Field of the Invention

The present invention relates to a noise reduction apparatus and an audio reproduction apparatus.

2. Description of the Related Art

There is known a noise reduction system that reduces noise from the ambient environment and provides a user with a quiet environment.

An example of the noise reduction system of this type is a noise reduction system of an active system that performs active noise reduction. The noise reduction system of the active system basically has a configuration described below. The noise reduction system of the active system collects external noise with a microphone serving as acoustic-electric converting means, generates a noise reduction audio signal having a phase acoustically opposite to that of the collected noise from an audio signal of the noise, reproduces the generated noise reduction audio signal with a speaker serving as electric-acoustic converting means, and combines the noise reduction audio signal with the noise to reduce the noise (see Japanese Patent No. 2778173).

On the market, there is also emerging an audio reproduction apparatus that supplies, in a state in which noise of the external environment is reduced by using the noise reduction system, an audio signal of music (hereinafter referred to as music signal), which a listener desires to listen to, to the speaker, which reproduces the noise reduction audio signal, and reproduces the music signal to provide a satisfactory reproduced sound field space in which external noise is reduced.

SUMMARY OF THE INVENTION

When only the noise reduction audio signal is supplied to a speaker for emitting noise reduction sound for reducing noise to cancel external noise and the noise cancellation is sufficiently performed, sound emitted from the speaker is cancelled and is not collected by a microphone for external noise collection. Therefore, no problem occurs in this case. However, when a music signal is supplied to a speaker that supplies a noise reduction audio signal, the microphone for external noise collection collects music sound emitted from the speaker as well. Therefore, so-called howling occurs.

Therefore, various contrivances for preventing the howling from occurring have been devised. However, under the present situation, satisfactory results have not been obtained in terms of sufficiently showing a noise reduction effect and preventing howling from occurring.

Therefore, it is desirable to provide a noise reduction apparatus that can obtain, with the simple structure, a sufficient noise reduction effect while preventing howling.

According to an embodiment of the present invention, there is provided a noise reduction apparatus including:

a speaker with a speaker unit held by holding means to make it possible to mix sounds emitted from the front and rear of a vibration plate of the speaker;

a microphone provided in an area where the sounds emitted from the front and rear of the vibration plate of the speaker are mixed and cancelled; and means for supplying a noise reduction audio signal obtained by phase-inverting an audio signal collected by the microphone to the speaker.

In the speaker with the speaker unit held by the holding means to make it possible to mix the sounds emitted from the front and rear of the vibration plate, a sound wave emitted from the front of the vibration plate and a sound wave emitted from the rear of the vibration plate have opposite phases. Therefore, in an area in a surface parallel to a surface including an outer peripheral end of the vibration plate of the speaker and further on an outer side than the outer peripheral end of the vibration plate, there is an area in which sounds emitted from the front and rear of the vibration plate are mixed and cancelled to reduce a sound pressure to nearly zero.

According to the embodiment of the present invention, since the microphone that collects external noise is provided in the area where a sound pressure is nearly zero, sound emitted from the speaker is not collected by the microphone. Therefore, the microphone collects only the external noise.

When the noise reduction audio signal obtained by phase-inverting an audio signal of the external noise collected by the microphone is supplied to the speaker, the external noise can be cancelled or reduced. In this case, since sound emitted from the speaker is not included in sound collected by the microphone, so-called howling does not occur.

According to the embodiment of the present invention, a noise reduction audio signal obtained by phase-inverting an audio signal collected by the microphone provided in the area in which sounds emitted from the front and rear of the vibration plate of the speaker are mixed and cancelled is supplied to the speaker. Therefore, it is possible to provide a noise reduction apparatus that can obtain a sufficient noise reduction effect while preventing howling.

BRIEF DESCRIPTION OF THE DRAWINGS

FIG. 1 is a block diagram of an example of the basic structure of a noise reduction apparatus according to a first embodiment of the present invention;

FIG. 2 is a diagram for explaining an arrangement position of a microphone for external noise collection of the noise reduction apparatus according to the first embodiment;

FIGS. 3A to 3C are diagrams for explaining a noise reduction effect by the noise reduction apparatus according to the first embodiment;

DESCRIPTION OF THE PREFERRED EMBODIMENTS

Figure 4:
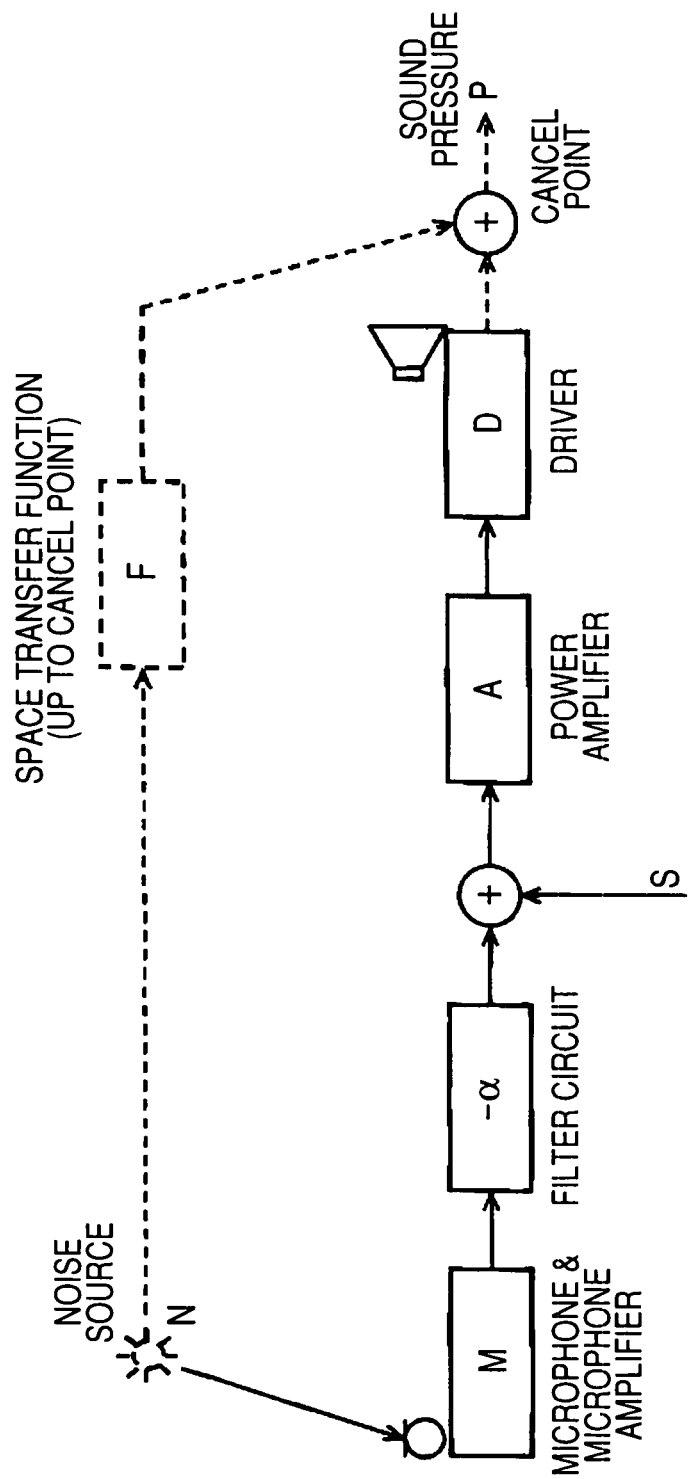
FIG. 4 is a diagram for explaining, using a transfer function, a noise reduction operation of the noise reduction apparatus according to the first embodiment.

Embodiments of the present invention will be hereinafter explained with reference to the accompanying drawings.

FIGS. 1 to 4 are diagrams for explaining an example of the theoretical structure of a noise reduction apparatus according to a first embodiment of the present invention.

In the noise reduction apparatus according to the first embodiment shown in FIG. 1, a speaker 1 is arranged near the ears of a listener 3. The speaker 1 is configured as a so-called bare speaker in which a speaker unit thereof is not housed in a speaker box and is not attached to a baffle plate to make it possible to mix sounds emitted from the front and rear of a vibration plate of the speaker.

In the bare speaker 1, as shown in FIG. 2, a sound wave Sf emitted from the front of the vibration plate and a sound wave Sb emitted from the rear of the vibration plate are mixed. A phase of the sound wave Sf emitted from the front of the vibration plate and a phase of the sound wave Sb emitted from the rear of the vibration plate are opposite to each other. Therefore, an area (hereinafter referred to as sound pressure zero area) Zo in which the sounds emitted from the front and rear of the vibration plate are mixed and cancelled to reduce a sound pressure to nearly zero is present in an area in a surface parallel to a surface including an outer peripheral end of the vibration plate of the speaker 1 and further on an outer side than the outer peripheral end of the vibration plate.

The sound pressure zero area Zo can be checked by, when sound is reproduced by the speaker 1, collecting a sound wave emitted from the speaker 1 using a microphone. In FIG. 2, this area is indicated by a broken line 4.

In this embodiment, a microphone 2 for external noise collection is arranged in an arbitrary position of the sound pressure zero area Zo. Practically, for example, since an area near an outer periphery of a frame of the speaker 1 is the sound pressure zero area Zo, the microphone 2 is fixed to the frame of the speaker 1 and arranged in the sound pressure zero area Zo. In this example, holding means for the microphone 2 is the speaker 1.

External noise Nz (see FIG. 3A) arriving from a noise source around the listener 3 is collected by the microphone 2. An audio signal of the external noise Nz obtained by being subjected to acoustic-electric conversion by the microphone 2 is supplied to a low-pass filter 12 through a microphone amplifier 11. An output audio signal of the low-pass filter 12 is supplied to a filter circuit 13 for noise reduction and a noise reduction audio signal is generated. The noise reduction audio signal is supplied to the speaker 1 through a mixing circuit 14 and a power amplifier 15.

A reason for providing the low-pass filter 12 is as described below. In particular, low-frequency sounds in sounds emitted from the front and rear of the vibration plate of the bare speaker 1 have a substantial effect of sound cancellation. Medium- and high-frequency components of the sounds emitted from the front and rear of the vibration plate of the bare speaker 1 are substantially attenuated in the sound pressure zero area Zo but are not completely reduced to zero.

Therefore, in this embodiment, in order to make it possible to more surely reduce noise, in the external noise Nz collected by the microphone 2, noise reduction objects are limited to only low-frequency components, which are nearly completely cancelled when the microphone 2 is arranged in the sound pressure zero area Zo, by the low-pass filter 12. This makes it possible to stably reduce noise without howling. A cutoff frequency in the low-pass filter 12 is set to, for example, a frequency equal to or lower than 200 Hz and, in this example, 200 Hz.

The filter circuit 13 is basically a circuit for phase-inverting an audio signal of the external noise Nz to generate a noise reduction audio signal. The filter circuit 13 performs correction taking into account a space transfer function between an external noise sound source position and a listening position of the listener 3 where noise should be cancelled, i.e., a noise cancel point and corrects characteristics in the microphone amplifier 11 and the power amplifier 15. In this example, the filter circuit 13 includes a digital filter.

Although not shown in the figure, the filter circuit 13 can include an A/D converter that converts an analog audio signal from the low-pass filter 12 into a digital audio signal, a digital filter including an FIR (Finite Impulse Response) filter that receives the digital audio signal from the A/D converter, and a D/A converter that converts the digital audio signal processed by the digital filter into an analog audio signal.

As a filter coefficient of the digital filter of the filter circuit 13, a value for phase-inverting an input audio signal and correcting the space transfer function and the characteristics of the amplifiers 11 and 14 is supplied.

In this embodiment, as described above, the noise reduction objects are limited to the low-frequency components. However, since a low-frequency sound area of the low-frequency components is an area where there is no human sense of direction, the correction performed by the filter circuit 13 using the space transfer function may be omitted. Therefore, the filter circuit 13 shown in FIG. 1 does not have to be provided. However, when the correction for the characteristics of the amplifiers 11 and 15 is taken into account, it is better to provide the filter circuit 13 in a correction range of the characteristics.

A music source S, which the listener 3 desires to listen to, can be supplied to the mixing circuit 14. The supply of the music source S does not have to be performed. If the listener 3 does not desires to listen to the music source S, the mixing circuit 14 does not have to be provided either.

With the structure described above, when the music source S is not present, a noise reduction sound Sc (see FIG. 3C) is emitted from the speaker 1.

Since a noise reduction audio signal is obtained by phase-inverting the audio signal of the external noise Nz, when the external noise Nz is the noise shown in FIG. 3A, the noise reduction sound Sc is sound anti-phase to the external noise Nz as shown in FIG. 3C. Therefore, the external noise Nz and the noise reduction sound Sc anti-phase to the external noise Nz are combined. As a result, sound Ms with the noise Nz reduced or cancelled is heard near the ears of the listener 3 as shown in FIG. 3B.

The noise reduction apparatus having the structure shown in FIG. 1 is a noise reduction apparatus of a so-called feed-forward system. A noise reduction operation of the noise reduction apparatus of the feed-forward system is explained using transfer functions with reference to FIG. 4. FIG. 4 is a block diagram in which the respective units are represented by using transfer functions of the units in association with the block diagram shown in FIG. 1.

In FIG. 4, A represents a transfer function of the power amplifier 14, D represents a transfer function of the speaker 1 serving as a driver, M represents a transfer function corresponding to a section of the microphone 2 and the microphone amplifier 11, $-\alpha$ represents a transfer function of a filter designed for noise reduction of the feed-forward system, which includes a transfer function for phase inversion. F represents a space transfer function from a position of an external noise source to a position of the cancel point near the ears of the listener 3.

When the respective units are represented as shown in FIG. 4, a sound pressure P at the cancel point near the ears of the listener 3 in the noise reduction apparatus having the block structure shown in FIG. 1 is represented as follows when a noise signal is represented as N:

$$P = -ADM\alpha N + FN + ADS \quad (1)$$

Here, when the space transfer function F is represented as $$F \approx ADM\alpha \quad (2)$$

i.e., if the transfer function $-\alpha$ of the filter circuit 13 is designed to satisfy Expression (2), Expression (1) is changed as follows:

$$P \approx ADS \quad (3)$$

Therefore, in the sound pressure P at the cancel point, the noise Nz is cancelled and only the music source S is present. In Expression (3), when it is assumed that the music source S=0, i.e., there is no music source, P≅0. The sound pressure P at the cancel point means that the noise Nz is cancelled and is not present.

Second Embodiment

In the explanation of the first embodiment, the example of the theoretical structure of the noise reduction apparatus according to the first embodiment is explained. In a second embodiment of the present invention, a noise reduction apparatus is applied to an object of realizing noise reduction in an automobile.

In general, engine noise of an automobile and noise caused by the rotation of tires while the automobile is running (tire noise) are low-frequency noise. It is an object of the second embodiment to reduce the engine noise and the tire noise.

Figure 5:
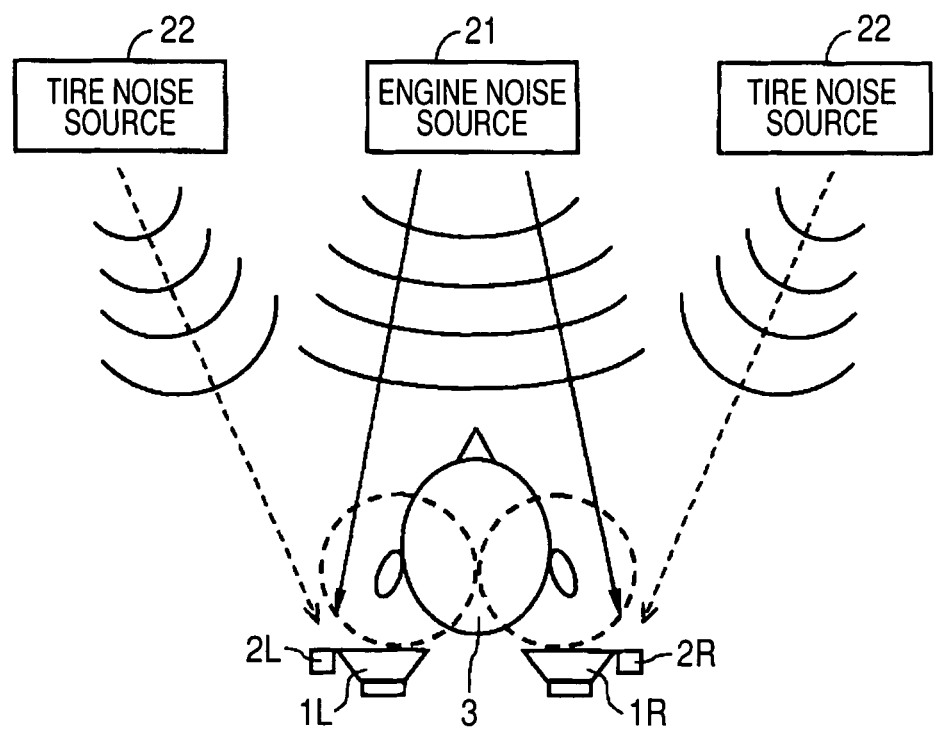
FIG. 5 is a diagram for schematically explaining a noise reduction apparatus according to a second embodiment of the present invention.

FIG. 5 is a diagram for explaining an example of an arrangement of speakers that emit noise reduction sound in the second embodiment. In the second embodiment, speakers 1L and 1R for reducing noise near the left and right ears are provided behind the ears of the listener 3 who sits on a driver's seat or the seat next to the driver.

Like the speaker 1 explained in the first embodiment, the speakers 1L and 1R are configured as so-called bare speakers in which speaker units are not housed in speaker boxes and are not attached to baffle plates to make it possible to mix sounds emitted from the front and rear of vibration plates of the speaker units. Microphones 2L and 2R for external noise collection are arranged in areas Zo where a sound pressure is nearly zero with respect to sounds emitted from the respective speakers 1L and 1R. Practically, as explained in the first embodiment, for example, the microphones 2L and 2R are fixed to outer peripheries of frames of the speakers 1L and 1R and arranged in the sound pressure zero areas Zo, respectively.

External noises Nz arriving from noise sources around the listener 3, i.e., in this example, an engine noise source 21 and a tire noise source 22 are collected by the microphones 2L and 2R, respectively. Noise reduction audio signals for left and right channels generated in the same manner as the first embodiment on the basis of the external noises Nz collected by the microphones 2L and 2R, respectively, are supplied to the speakers 1L and 1R, respectively. Consequently, the external noises Nz arriving from the engine noise source 21 and the tire noise source 22 are cancelled near both the left and right ears of the listener 3 and noise reduction is performed.

Figure 6:
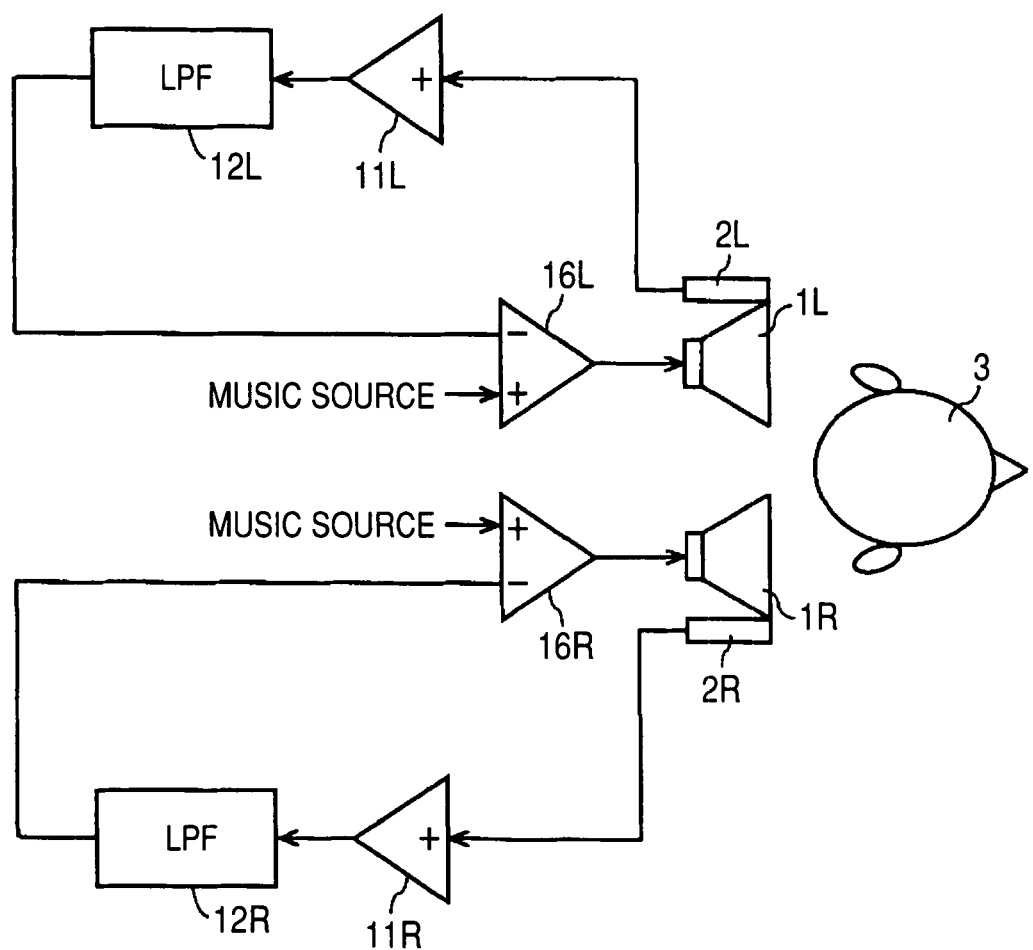
FIG. 6 is a block diagram showing an example of the structure of the noise reduction apparatus according to the second embodiment.

A block diagram of an example of the structure of the noise reduction apparatus according to the second embodiment is shown in FIG. 6. In the example shown in FIG. 6, as explained in the first embodiment, noise reduction objects are limited to, for example, low-frequency components equal to or lower than 200 Hz. In this way, the filer circuit 13 in the first embodiment is removed.

An audio signal of the external noise Nz collected by the microphone 2L attached to the speaker 1L, which is arranged behind the left ear of the listener 3, and provided in the sound pressure zero area Zo is supplied to a low-pass filter 12L through a microphone amplifier 11L to be limited to only low-frequency components with a frequency, for example, equal to or lower than 200 Hz.

The low-frequency components of the noise Nz from the low-pass filter 12L are supplied to an inversion input terminal of a differential amplifier 16L that forms a power amplifier. Therefore, a noise reduction audio signal obtained by phase-inverting the low-frequency components of the noise Nz from the low-pass filter 12L is obtained from the differential amplifier 16L and supplied to the speaker 1L.

Consequently, noise reduction sound for the left ear is emitted from the speaker 1L and acoustically combined with the external noise Nz. As in the first embodiment, the external noise Nz near the left ear of the listener 3 is reduced or cancelled.

In the same manner, an audio signal of the external noise Nz collected by the microphone 2R attached to the speaker 1R, which is arranged behind the right ear of the listener 3, and provided in the sound pressure zero area Zo is supplied to a low-pass filter 12R through a microphone amplifier 11R to be limited to only low-frequency components with a frequency, for example, equal to or lower than 200 Hz.

The low-frequency components of the noise Nz from the low-pass filter 12R are supplied to an inversion input terminal of a differential amplifier 16R that forms the power amplifier. Therefore, a noise reduction audio signal obtained by phase-inverting the low-frequency components of the noise Nz from the low-pass filter 12R is obtained from the differential amplifier 16R and supplied to the speaker 1R.

Consequently, noise reduction sound for the right ear is emitted from the speaker 1R and acoustically combined with the external noise Nz. As in the first embodiment, the external noise Nz near the right ear of the listener 3 is reduced or cancelled.

Figure 7:
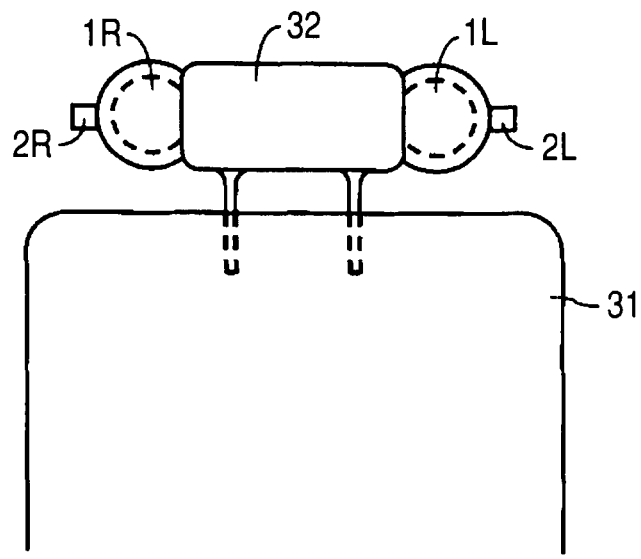
FIG. 7 is a diagram showing an example of an arrangement of a speaker and a microphone for external noise collection in the noise reduction apparatus according to the second embodiment.

As shown in FIG. 7, the speakers 1L and 1R and the microphones 2L and 2R can be attached to both the left and right sides of a headrest 32 of a seat 31 of the automobile.

In the structure shown in FIG. 6, audio signals of a music source that the listener 3 desires to listen to, for example, in the left and right two channels are supplied to non-inversion input terminals of the differential amplifiers 1L and 1R. Consequently, the listener 3 can listen to music of the music source in a state in which external noise, i.e., engine noise and tire noise are reduced or cancelled.

However, in the case of the example shown in FIG. 7, the speakers 1L and 1R are provided near and behind both the ears of the listener 3. Therefore, an audio image of music reproduction sound may be localized near the head of the listener 3. Therefore, as described in detail in an embodiment below, audio signals in the left and right channels as music sources supplied to non-inversion input terminals of the differential amplifiers 16L and 16R are, for example, in the case of stereo two channels, formed as signals subjected to virtual sound source processing to cause the listener 3 to feel as if sound is emitted from speakers set on the left and right in front of the listener 3.

When a music source is, for example, a 5.1-channel multi-surround audio signal, the audio signal is formed as a signal subjected to the virtual sound source processing by the speakers 1L and 1R such that speakers for all channels are placed in appropriate positions.

Third Embodiment

An audio reproduction apparatus according to a third embodiment of the present invention includes the noise reduction apparatus according to the embodiments described above and can reproduce 5.1-channel multi-surround sound. Like the second embodiment, the third embodiment is applied to an audio reproduction apparatus mounted on an automobile.

In the second embodiment, two speakers that supply noise reduction audio signal are used as speakers for the left and right ears of the listener 3. The two speakers 1L and 1R are provided on both the left and right sides of the headrest 32 of the seat 31 of the automobile as shown in FIG. 7. When the seat 31 is a driver's seat, it is likely that the speakers 1L and 1R provided on both the left and right of the headrest 32 interfere with a driver's sight when a driver checks the rear in moving back the automobile.

Figure 8:
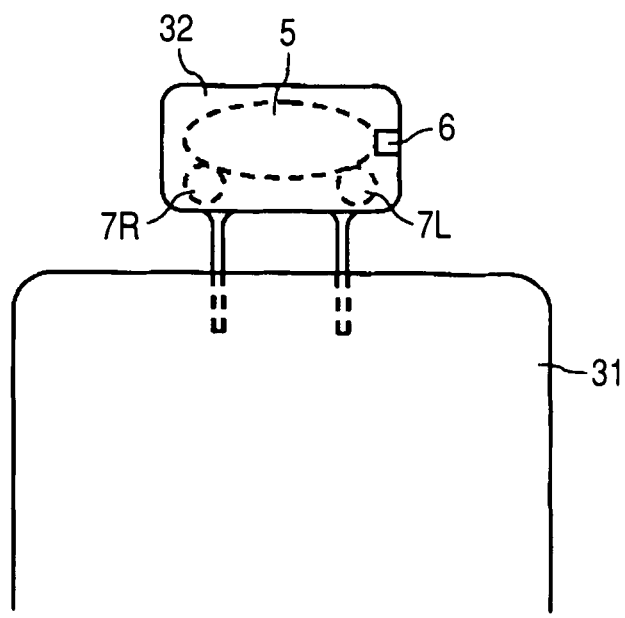
FIG. 8 is a diagram showing an example of an arrangement of a speaker and a microphone for external noise collection in an audio reproduction apparatus including a noise reduction apparatus according to a third embodiment of the present invention.

Therefore, in the third embodiment, only one bare speaker 5 for low frequencies supplies a noise reduction audio signal. As shown in FIG. 8, the speaker 5 is provided in the headrest 32. The speaker 5 is attached in the headrest 32 without being attached to a baffle plate.

The headrest 32 may be long in the vertical direction such that the speaker 5 is located above a portion where the head of the listener 3 is placed when the listener 3 sits on the seat. The headrest 32 is arranged such that a sound emission vibration surface of the speaker 5 faces directions of both the ears of the listener 3 even if the position of the speaker 5 is above the head of the listener 3.

In the third embodiment, as in the embodiments described above, noise reduction objects are only low-frequency components. As described above, since a low-frequency sound area is an area where there is no human sense of direction, even if the speaker 5 is one speaker present behind the listener 3 as in this example, it is possible to attain an expected object of canceling or reducing low-frequency components of external noise.

In this embodiment, the speaker 5 is a speaker for low frequencies. Therefore, for example, a relatively large elliptical speaker having an aperture equal to or larger than 16 cm is used.

In this example, the microphone 6 that collects the external noise Nz is attached to a frame of the speaker 5. As described above, an attaching position of the microphone 6 is the sound pressure zero area Zo where a sound pressure with respect to sound emitted from the speaker 5 is nearly zero. In an example shown in FIG. 8, the microphone 6 is attached to a position behind the left ear of the listener 3. Although the microphone 6 is provided only behind the left ear and a microphone is not provided for the right ear. However, when noise reduction objects are limited to low-frequency components as described above, since there is no sense of direction, no trouble occurs.

In the third embodiment, low-frequency components of music, which the listener 3 desires to listen to, or the like are emitted from the speaker 5. However, medium-and high-frequency components of the music, which the listener 3 desires to listen to, or the like are emitted by the two small speakers 7L and 7R for medium-and high frequencies. As the two speakers 7L and 7R for medium and high frequencies, for example, small speakers having an aperture of 2 cm can be used. As shown in FIG. 8, the speakers are provided on the left and right below the speaker 5 in the headrest 32.

In this example, like the speaker 5, the two speakers 7L and 7R for medium and high frequencies are configured as bare speakers attached without being attached to baffle plates, respectively. However, the speakers 7L and 7R for medium and high frequencies may be attached to baffle plates and housed in speaker boxes rather than being configured as bare speakers.

It is desirable that, in order to collect only noise more accurately, the speakers 7L and 7R for medium and high frequencies are arranged such that a sound pressure zero area for sounds emitted from the speakers 7L and 7R for medium and high frequencies overlap a sound pressure zero area for sound emitted from the speaker 5 and the microphone 6 is provided in the overlapping sound pressure zero area.

In the third embodiment, audio signals of music, which the listener 3 desires to listen to, or the like, for example, stereo signals in the left and right two channels and a 5.1-channel multi-surround signal are subjected to the virtual sound source processing described later, supplied to the speaker 5 and 7L and 7R, and reproduced. Consequently, reproduced sound fields are generated that are the same as those generated when speakers for channels corresponding to the original stereo signals in the left and right two channels and the 5.1-channel multi-surround signal are arranged in appropriate positions and the signals are reproduced.

In the third embodiment, sounds in all of the stereo two channels and 5.1-channel multi-surround audio channels are emitted by the three speakers 5, 7L, and 7R provided near the listener 3 to maximize the effects of noise reduction and energy saving.

In the third embodiment, a listener 3A as a driver and a listener 3B in, for example, the seat next to the driver are allowed to enjoy stereo sounds in the left and right two channels and the 5.1-channel surround sound in optimum environments, respectively.

Figure 9:
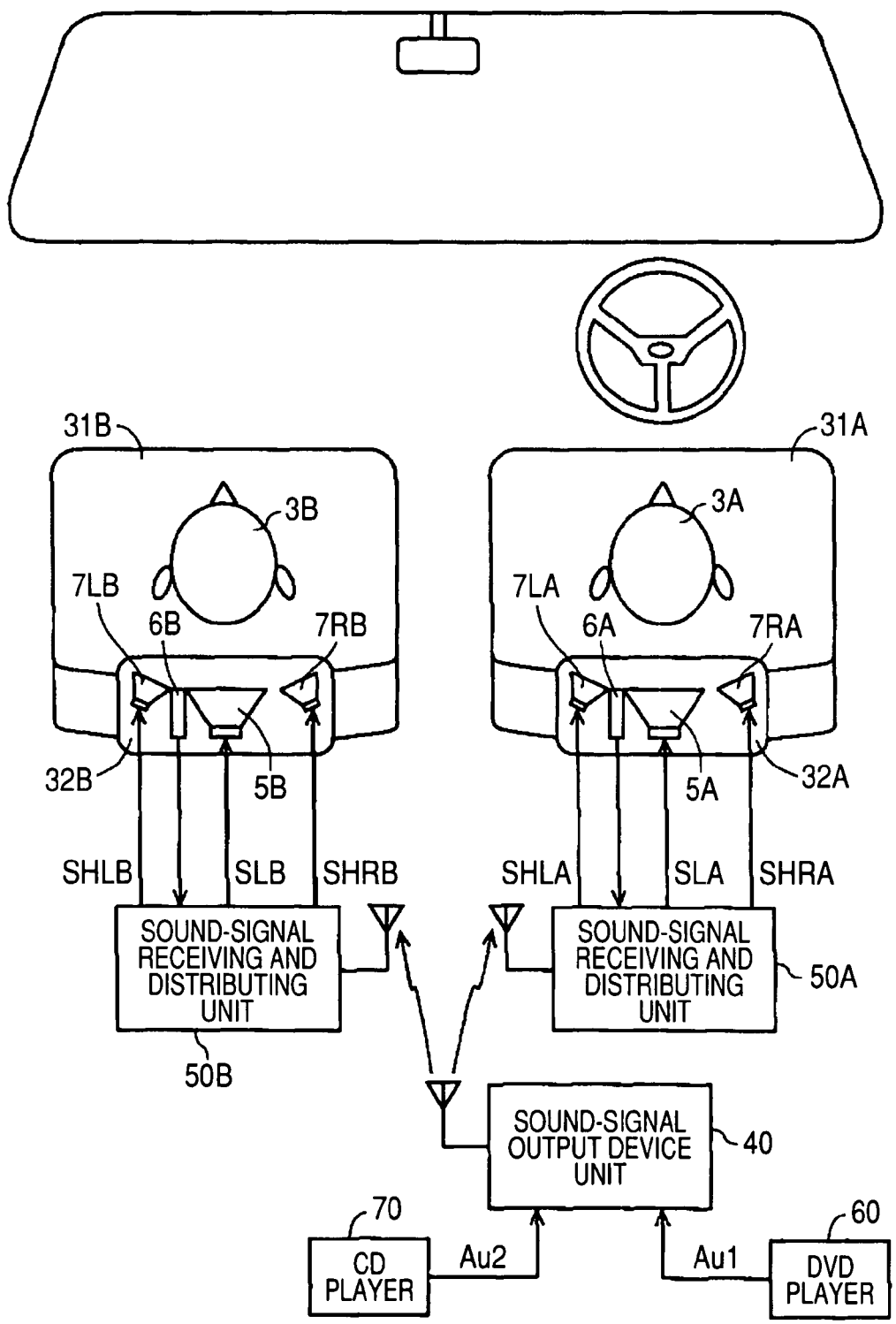
FIG. 9 is a diagram showing an example of a system configuration of the audio reproduction apparatus including the noise reduction apparatus according to the third embodiment.

FIG. 9 is a diagram schematically showing an audio reproduction system according to the third embodiment. In FIG. 9, a part of components provided for the listener 3A and the listener 3B are the same. The same components are denoted by the same reference numerals and signs. Components corresponding to the listener 3A are suffixed with A and components corresponding to the listener 3B are suffixed with B.

In the third embodiment, as shown in FIG. 9, the three speakers are arranged in each of a driver's seat 31A and a seat next to the driver 31B. For the listener 3A who sits on the driver's seat 31A, in this example, in a headrest 32A of the driver's seat 31A, a speaker 5A for noise reduction and for low frequencies is arranged behind the center of the head of the listener 3A and speakers 7LA and 7RA for medium and high frequencies are arranged on both the left and right sides below the speaker 5A. A microphone 6A is attached to a sound pressure zero area Zo for sound emitted from the speaker 5A.

For the listener 3B who sits on the seat next to the driver 31B, in this example, in a headrest 32B of the seat next to the driver 31B, a speaker 5B for noise reduction and for low frequencies is arranged behind the center of the head of the listener 3B and speakers 7LB and 7RB for medium and high frequencies are arranged on both the left and right sides below the speaker 5B.

The speakers 5A and 5B for noise reduction and for low frequencies are bare speakers as described above. In this example, the speakers 7LA and 7RA and the speakers 7LB and 7RB for medium and high frequencies are bare speakers, respectively, as described above. As described above, the speakers 7LA and 7RA and the speakers 7LB and 7RB for medium and high frequencies may be attached to baffle plates and housed in speaker boxes rather than being configured as bare speakers.

As shown in FIG. 9, besides the speakers described above, the audio reproduction system according to the third embodiment includes an audio-signal output device unit 40, audio-signal receiving and distributing units 50A and 50B, a DVD (Digital Versatile Disc) player 60, and a CD (Compact Disc) player 70.

An audio signal Au1 from the DVD player 60 and an audio signal Au2 from the CD player 70 are supplied to the audio-signal output device unit 40. The audio signal Au1 from the DVD player 60 is 5.1-channel surround sound in some case. However, the audio signal Au2 from the CD player 70 is an audio signal in the left and right two channels.

In the third embodiment, the audio-signal output device unit 40 has a decoding function corresponding to the 5.1-channel multi-channel surround sound system. When it is attempted to reproduce the 5.1-channel surround sound signal from the DVD player 60, the audio-signal output device unit 40 generates an audio signal supplied to the speakers 5A, 7LA, and 7RA or the speakers 5B, 7LB, and 7RB provided near both the ears of the user 3A or 3B and behind the head of the listener 3A or 3B.

The audio-signal output device unit 40 multiplexes the generated audio signal supplied to the speakers 5A, 7LA, and 7RA or the speakers 5B, 7LB, and 7RB and, in this example, transmits the audio signal to the audio-signal receiving and distributing units 50A and 50B by radio using a radio wave.

In this embodiment, the audio-signal output device unit 40 has a function of subjecting audio signals in front left and right channels to the virtual sound source processing and generating signals in two channels transmitted to the audio-signal receiving and distributing units 50A and 50B. The audio-signal output device unit 40 also has a function of subjecting the 5.1-channel multi-surround audio signal to the virtual sound source processing and generating signals in two channels transmitted to the audio-signal receiving and distributing units 50A and 50B.

When audio signals in the left and right two channels from the DVD player 60 or the CD player 70 are inputted, as described later, the audio-signal output device unit 40 according to the third embodiment performs the virtual sound source processing for audio signals in the front left and right two channels, generates audio signals in two channels transmitted to the audio-signal receiving and distributing units 50A and 50B, and transmits the audio signals to the audio-signal receiving and distributing units 50A and 50B.

The radio transmission from the audio-signal output device unit 40 to the audio-signal receiving and distributing units 50A and 50B is not limited to transmission by the radio wave. Ultrasound and light may be used.

The audio-signal receiving and distributing units 50A and 50B decode the audio signals in the two channels received from the audio-signal output device unit 40 and separate low-frequency components and medium and high frequency components in the left and right two channels from the audio signals in the two channels. The audio-signal receiving and distributing units 50A and 50B generate signals supplied to the three speakers 5A, 7LA, and 7RA and the three speakers 5B, 7LB, and 7RB for the listeners 3A and 3B, respectively, and supply the signals to the speakers.

Left channel medium-and high-frequency components SHLA and right channel medium-and high-frequency components SHRA from the audio-signal receiving and distributing unit 50A are supplied to the speaker 7LA for medium and high frequencies for the left channel of the driver's seat 31A and the speaker 7RA for medium and high frequencies for the right channel of the driver's seat 31A, respectively. Low-frequency components SLA from the audio-signal receiving and distributing unit 50A are supplied to speaker 5A for low frequencies of the driver's seat 31A.

Left channel medium-and high-frequency components SHLB and right channel medium-and high-frequency components SHRB from the audio-signal receiving distributing unit 50B are supplied to the speaker 7LB for medium and high frequencies for the left channel of the seat next to the driver 31B and the speaker 7RB for medium and high frequencies for the right channel of the seat next to the driver 31B, respectively. Low-frequency components SLB from the audio-signal receiving and distributing unit 50B are supplied to the speaker 5B for low frequencies of the seat next to the driver 31B.

It goes without saying that the audio-signal output device unit 40 and the audio-signal receiving and distributing units 50A and 50B may be connected by wire (cable) as a wire harness instead of radio transmission and reception.

In the third embodiment, external noises NzA and NzB collected by the microphones 6A and 6B arranged behind the left ears of the listeners 31A and 31B are supplied to the audio-signal receiving and distributing units 50A and 50B, respectively.

The audio-signal receiving and distributing units 50A and 50B generate noise reduction audio signals obtained by phase-inverting low-frequency components of audio signals of the external noises NzA and NzB collected by the microphones 6A and 6B, respectively, and supply the noise reduction audio signals to the speakers 5A and 5B for noise reduction and for low-frequencies, respectively.

Consequently, in the third embodiment, for each of the listeners 3A and 3B, two-channel stereo reproduction and 5.1 multi-channel surround reproduction are performed while the noise reduction processing is performed.

Figure 10:
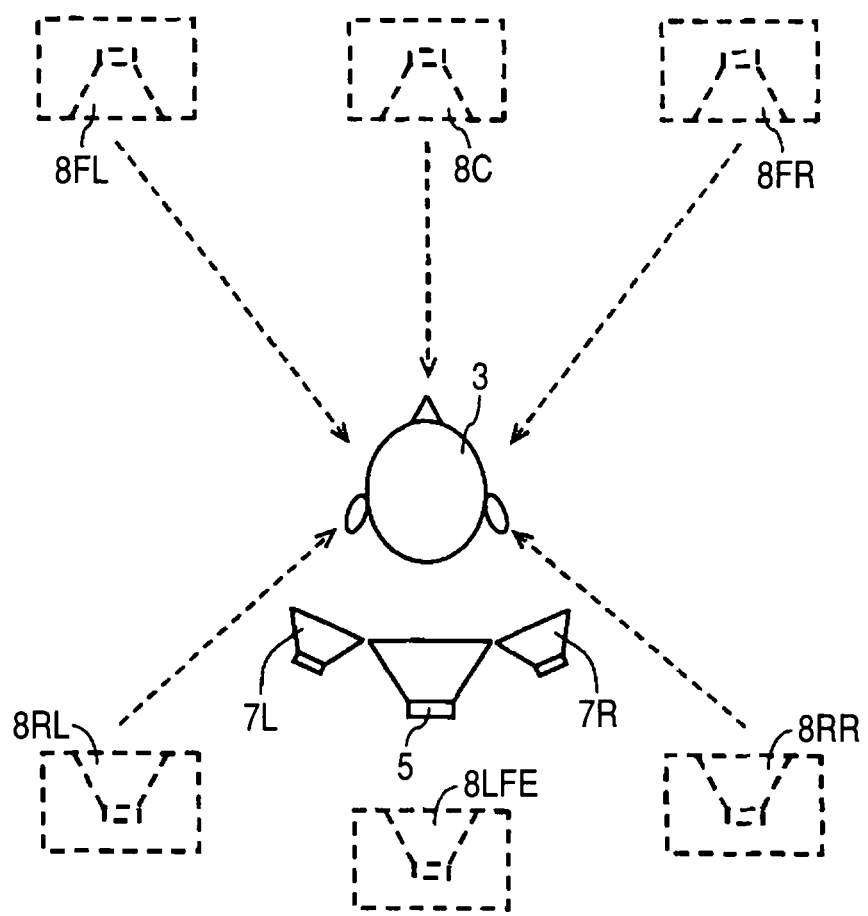
FIG. 10 is a diagram for explaining the audio reproduction apparatus according to the third embodiment shown in FIG. 9.

Explanation of a speaker arrangement and reproduced sound fields in the third embodiment Examples of a speaker arrangement and reproduced sound fields in the audio reproduction apparatus according to the third embodiment explained above are explained with reference to FIG. 10.

In the case of 5.1 multi-channel surround sound, there are front left and right two channels, a center channel, rear left and right two channels, and a channel exclusively used for low frequencies. In the past, speakers 8FL, 8FR, 8C, 8RL, 8RR, and 8LFE for reproduced sound for the respective channels are arranged in positions indicated by broken lines with respect to a position of the listener 3 in FIG. 10. Audio signals of the channels corresponding to the speakers 8FL, 8FR, 8C, 8RL, 8RR, and 8LFE are reproduced by the speakers, whereby a multi-channel surround sound field is generated.

In the past, as the speakers 8FL, 8FR, 8C, 8RL, 8RR, and 8LFE, speakers to which speaker units are attached with front sides of speaker boxes as baffle plates are arranged with respect to the listener 3 as shown in the figure.

In the third embodiment, the speakers 8FL, 8FR, 8C, 8RL, 8RR, and 8LFE are not arranged. Instead, the three speakers 5, 7L, and 7R are arranged near the listener 3 and behind the head of the listener 3.

Among the speakers 5, 7L, and 7R, the speakers is a speaker for low frequencies. In this embodiment, an elliptical speaker having a relatively large aperture is used as the speaker 5. The speaker 5 is arranged behind the center of the head (right being the head) of the listener 3. The speaker 5 is configured as a bare speaker in which a speaker unit thereof is not housed in a speaker box and is not attached to a baffle plate to make it possible to mix sounds emitted from the front and rear of a vibration plate of the speaker.

The speakers 7L and 7R are speakers for medium and high frequencies and are speakers having an aperture smaller than that of the speaker 5. The speakers 7L and 7R are arranged on both the left and right sides of the speaker 5, to be opposed to the left and right ears of the listener 3 such that vibration plates thereof are opposed to the left and right ears of the listener 3, respectively, from behind the head of the listener 3. In the case of this example, like the speaker 5, the speakers 7L and 7R are configured as bare speakers not attached to baffle plates as described above.

In this embodiment, low-frequency components of an audio signal in the 5.1 multi-channel subjected to the virtual sound source processing as described later are supplied to the speaker 5 arranged behind the head near the listener 3 and low-frequency sound is emitted from the speaker 5. Therefore, in this embodiment, the speaker 5 plays a function equivalent to that of a subwoofer.

Medium-and high-frequency components of the audio signal in the 5.1 multi-channel subjected to the virtual sound source processing described later are supplied to the speakers 7L and 7R arranged behind the head near the listener 3 and medium-and high-frequency sound is emitted from the speakers 7L and 7R.

Consequently, low-frequency sound in the LFE channel is emitted near the ears of the listener 3 by the speaker 5 behind the head of the listener 3. Therefore, the listener 3 listens to the sound at large volume. However, in a position apart from the listener 3, sounds emitted from the front and rear of the speaker unit of the speaker 5 have phases different 180 degrees from each other and cancel each other. Therefore, the listener 3 hardly hears the sounds. Therefore, it is possible to prevent a situation in which, as in the past, low-frequency sound is propagated to the neighborhood such as the house next door and causes trouble.

Figure 11:
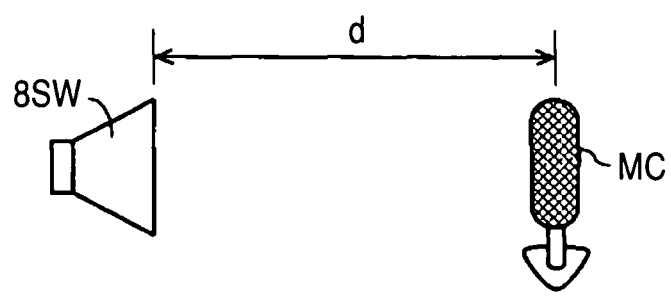
FIG. 11 is a diagram for explaining the audio reproduction apparatus according to the third embodiment shown in FIG. 9.

In order to check attenuation of low-frequency sound, as shown in FIG. 11, in an anechoic room, sound from a speaker unit 8SW having an aperture of, for example, 17 centimeters for a subwoofer was collected by a microphone MC in a position a distance "d" apart from a speaker unit 8SW and a frequency characteristic of a sound pressure level thereof was measured. Then, a result shown in FIG. 12 was obtained. In this case, the speaker unit 8SW was not housed in a box and attached to a baffle plate.

Figure 12:
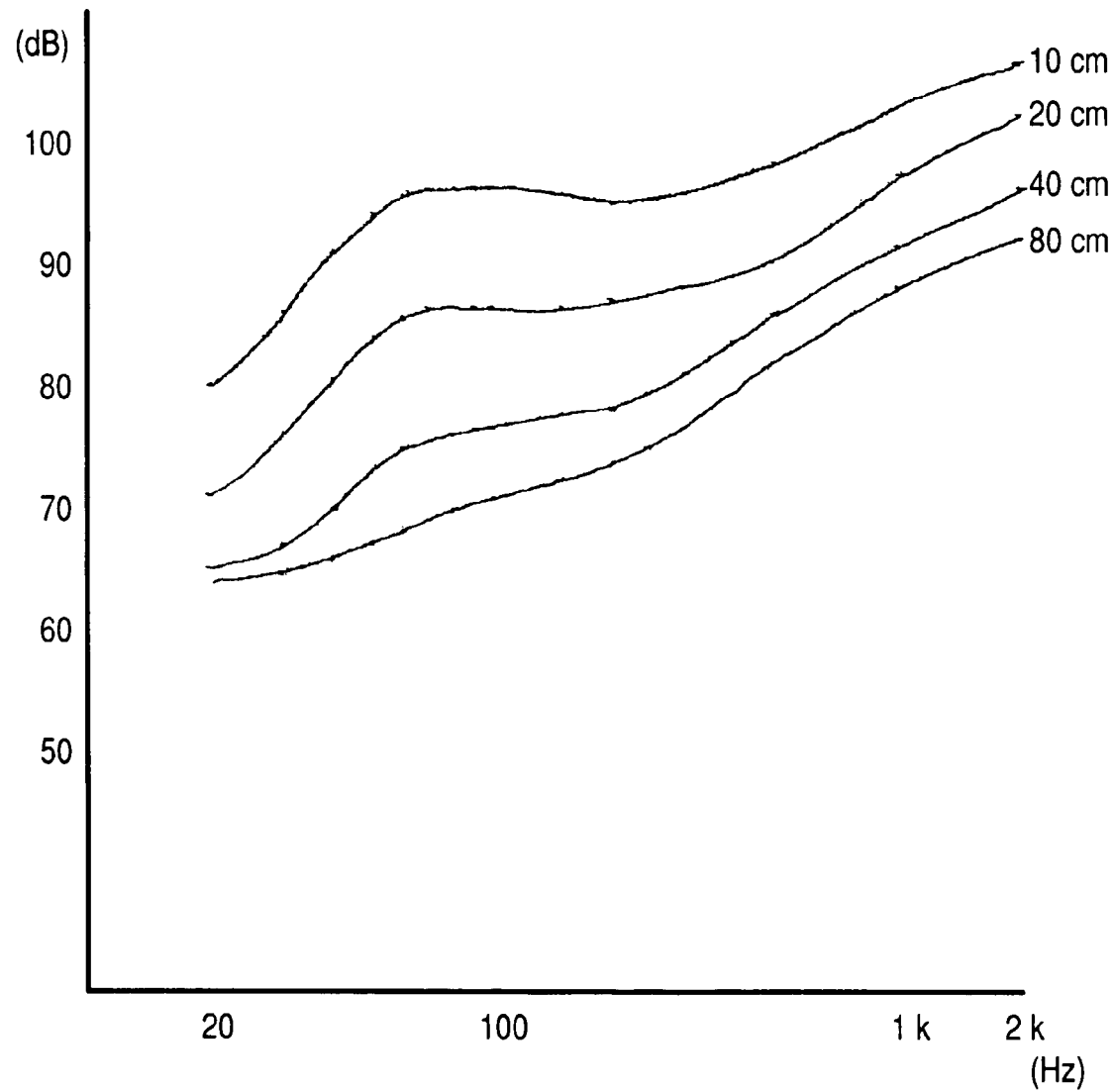
FIG. 12 is a graph for explaining the audio reproduction apparatus according to the third embodiment shown in FIG. 9.

Four frequency characteristic curves shown in FIG. 12 are those at the time when the distance "d" between the speaker unit 8SW and the microphone MC is 10 centimeters, 20 centimeters, 40 centimeters, and 80 centimeters, respectively.

It is seen from FIG. 12 that when a speaker unit is configured as a bare speaker not housed in a box, sound equal to or lower than 1 kHz is substantially attenuated. It is confirmed that, in particular, an attenuation amount of lower-frequency sound is larger.

In the case of this embodiment, a distance dsw between the speaker 5 and the left ear and the right ear of the listener 3 is set to a distance in which low-frequency sound is transmitted to the ears of the listener 3 without being substantially attenuated, i.e., about 20 centimeters in this example.

For example, whereas a distance between the speaker 5 and the ears of the listener 3 is 2 meters in a general configuration in the past, in this embodiment, the distance between the speaker 5 and the ears of the listener 3 is set to 20 centimeters. In the case of this embodiment, the distance is $1/10$ compared with that in the past.

Therefore, in this embodiment, energy necessary for allowing the listener 3 to feel a sound pressure same as that in the past only has to be $1/100$ of that in the general configuration in the past. In other words, if a 100 W (watt) amplifier is necessary in the general example described above, in the case of this embodiment, the listener 3 feels the same sound pressure even with a 1 W amplifier.

In this embodiment, diffusion of sound is small because of only a difference in an audio signal output supplied to the speaker. Moreover, low-frequency sound, for example, sound at 20 Hz, 30 Hz, and 40 Hz, is cancelled in terms of a phase. The sound is rarely heard except the limited vicinity of the speaker unit of the speaker 5 that plays a role of a subwoofer. On the other hand, a powerful acoustic effect included in DVD software is obtained by collecting large energy in this bass band. Therefore, the effect of noise insulation is further improved.

With the configuration described above, when attenuation of only the low-frequency sound is considered paying attention to only the low-frequency sound, the effect is sufficiently obtained.

In this embodiment, not only low-frequency sound but also medium-and high-frequency sound is reproduced by the two speakers 7L and 7R near both the ears of the listener 3. In other words, audio signals in all the channels are audio signals subjected to the virtual sound source processing, which are supplied to the speakers 7L and 7R opposed to the left ear and the right ear behind the listener 3 and reproduced.

Like the speaker 5, a distance from the speakers 7L and 7R to the ears of the listener 3 is small. Therefore, concerning audio signals in the medium-and high-frequencies, it is also possible to reduce radiation energy in registers thereof and contribute to noise insulation.

Figure 13:
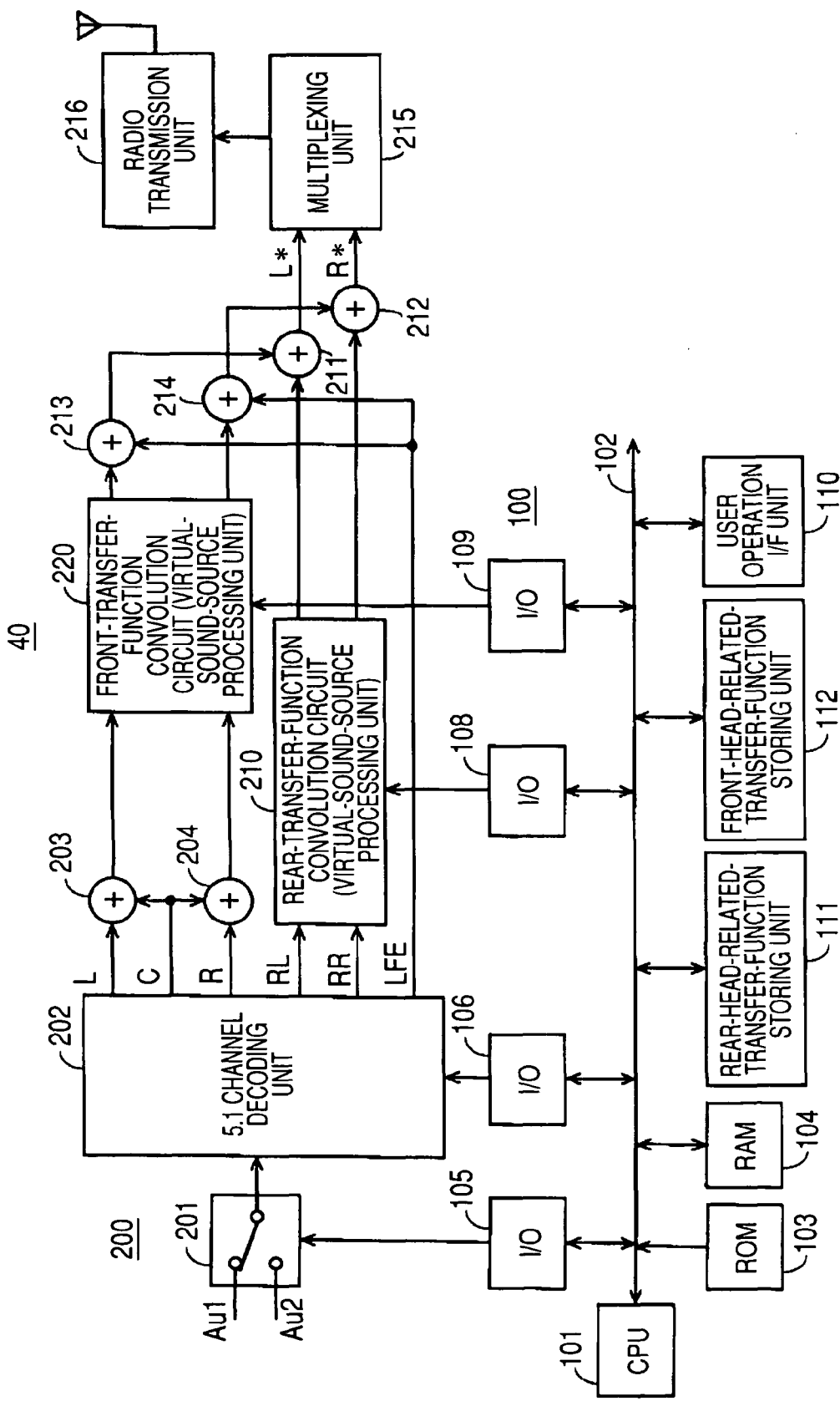
FIG. 13 is a block diagram showing an example of the structure of an audio-signal output device unit in the audio reproduction apparatus according to the third embodiment shown in FIG. 9.

Example of the structure of the audio-signal output device unit 40 according to the third embodiment FIG. 13 is a block diagram showing an example of the structure of the audio-signal output device unit 40 according to the third embodiment. The audio-signal output device unit 40 according to the third embodiment includes a control unit 100 including a microcomputer and an audio-signal processing unit 200.

In the control unit 100, a ROM (Read Only Memory) 103 having software programs and the like stored therein, a RAM (Random Access Memory) 104 for a work area, plural input and output ports 105, 106, 108, and 109, a user operation interface unit 110, a rear-head-related-transfer-function (HRTF) storing unit 111, a front-head-related-transfer-function unit 112, and the like are connected to a CPU. (Central Processing Unit) 101 through a system bus 102. As the user operation interface unit 110, besides a key operation unit and the like directly provided in the audio-signal output device unit 40, there is an operation unit including a remote commander and a remote control receiving unit.

As described above, in this embodiment, it is possible to input the audio signal Au1 from the DVD player 60 and the audio signal Au2 from the CD player 70 to the audio-signal output device unit 40. The inputted audio signals Au1 and Au2 are supplied to an input selection switch circuit 201.

The input selection switch circuit 201 is switched by a switching signal, which is supplied through the input and output port 105 of the control unit 100, according to selection operation of the listener 3 performed through the user operation interface unit 110. When sound from the DVD player 60 is selected by the listener 3, the switch circuit 201 is switched to select the audio signal Au1. When sound from the CD player 70 is selected, the switch circuit 201 is switched to select the audio signal Au2.

The audio signal selected by the switch circuit 201 is supplied to a 5.1-channel decoding unit 202. The 5.1-channel decoding unit 202 subjects, when the audio signal Au1 from the DVD player 60 is outputted at the switch circuit 201 and the 5.1 channel is selected in the user operation interface 110, the audio signal Au1 to channel decode processing and outputs the audio signals L and R in the front left and right channels, the audio signal C in the center channel, the audio signals RL and RR in the rear left and right channels, and the low-frequency audio signal LFE.

The audio signals RL and RR in the rear left and right two channels obtained by decoding the audio signal Au1 in the 5.1-channel decoding unit 202 are supplied to a rear-transfer-function convolution circuit 210 serving as a virtual sound source processing unit.

The rear-transfer-function convolution circuit 210 convolutes, for example, using a digital filter, a rear head related transfer function, which is prepared in the rear-head-related-transfer-function storing unit 111 in advance, in the audio signals RL and RR in the rear left and right two channels from the 5.1-channel decoding unit 202.

Therefore, in the rear-transfer-function convolution circuit 210, when an input audio signal thereto is not a digital signal, the input audio signal is converted into a digital signal. After the rear head related transfer function is convoluted therein, the input audio signal is reset to an analog signal and outputted.

Figure 14A:
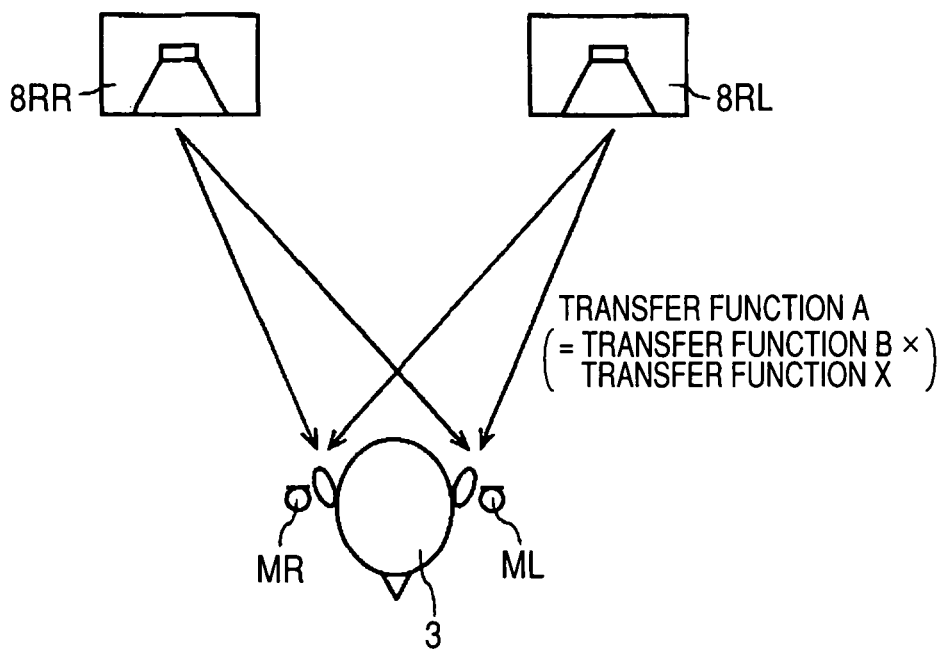
FIGS. 14A and 14B are diagrams for explaining the structure of a part of the audio-signal output device unit shown in FIG. 9.
Figure 14B:
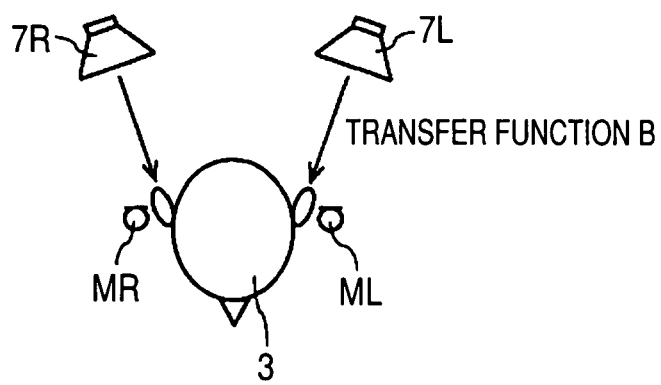

In this example, the rear head related transfer function is measured and calculated as described below and stored in the rear-head-related-transfer-function storing unit 111. FIGS. 14A and 14B are diagrams for explaining a method of measuring the rear head related transfer function.

As shown in FIG. 14A, a microphone ML for left channel measurement and a microphone MR for right channel measurement are set near both the left and right ears of the listener 3. A speaker 8RL for the rear left channel is set in a place behind the listener 3 where a speaker for the rear left channel is usually arranged. For example, emitted sound emitted when impulse is reproduced by the speaker 8RL for the rear left channel is collected by the respective microphones ML and MR. A transfer function for transfer from the rear speaker 8RL to the left and right ears (a rear head related transfer function for the rear left channel) is measured from an audio signal of the collected sound.

In the same manner, for example, emitted sound emitted when impulse is reproduced by a speaker 8RR for the rear right channel is collected by the respective microphones ML and MR. A transfer function for transfer from the rear speaker 8RR to the left and right ears (a rear head related transfer function for the rear right channel) is measured from an audio signal of the collected sound.

It is advisable that, when the rear speakers 8RL and 8RR are set in positions at an angle of 30 degrees and a distance of 2 m to the left and right from the center behind the listener 3, a transfer function for transfer from the respective speakers to both the ears is measured and the measured transfer function is applied as the rear head related transfer function.

Explanation of the transfer function is further supplemented below. For example, in FIG. 14A, a transfer function for transfer from left behind to the left ear is represented as a transfer function A. As shown in FIG. 14B, a transfer function obtained by measuring a transfer function for transfer from the speaker 7L near the ears to the microphone ML is represented as a transfer function B. A transfer function X, with which the transfer function B is multiplied to obtain the transfer function A, is calculated. The calculated transfer function X is convoluted in signal sound sent to the speaker 7L near the ears. Then, the listener 3 feels as if sound emitted from the speaker 7L at that point is sound traveling from a position 2 m left behind the listener 3. Concerning the right channel, a transfer function can be calculated in the same manner.

The transfer function X does not always have to be calculated. In some case, only the transfer function A has to be calculated. One transfer function is explained above as a representative transfer function. However, it goes without saying that, as shown in FIGS. 14A and 14B, actually, there are plural transfer functions.

The rear head related transfer function measured as described above is stored in the rear-head-related-transfer-function storing unit 111, supplied to the rear-transfer-function convolution circuit 210 through the input and output port 108, and convoluted in the rear-transfer-function convolution circuit 210. Consequently, when audio signals RL* and RR* from the rear-transfer-function convolution circuit 210 are supplied to the speakers 7L and 7R arranged near both the ears and reproduced, the listener 3 listens to reproduced sound as if the reproduced sound is emitted from the left and right rear speakers 8RL and 8RR behind the listener 3.

Levels of the audio signals RL* and RR* in the rear left and right channels subjected to the virtual sound source processing at this point maybe lower than levels of the signals supplied to the speakers 8RL and 8RR. This is because the speakers 7L and 7R are provided near the ears of the listener 3.

Sound is heard as if the sound is emitted from virtual speaker positions because of the head related transfer function convolution. Therefore, in this specification, the processing described above is referred to as virtual sound source processing.

The audio signals RL* and RR* subjected to the virtual sound source processing from the rear-transfer-function convolution circuit 210 as described above are supplied to combining units 211 and 212.

An audio signal L in the front left channel and an audio signal C in the center channel from the 5.1-channel decoding unit 202 are combined by a combining unit 203. A combined output audio signal (L+C) of the audio signals is supplied to a front-transfer-function convolution circuit 220 that forms the virtual sound source processing unit. An audio signal R in the front right channel and the audio signal C in the center channel from the 5.1-channel decoding unit 202 are combined by the combining unit 204. A combined output audio signal (R+C) of the audio signals is supplied to the front-transfer-function convolution circuit 220.

The front-transfer-function convolution circuit 220 has the structure same as that of the rear-transfer-function convolution circuit 210. The front-transfer-function convolution circuit 220 convolutes, for example, using a digital filter, a front head related transfer function prepared in the front-head-related-transfer-function storing unit 112 in advance in the audio signals from the combining units 203 and 204.

Therefore, in the front-transfer-function convolution circuit 220, when an input audio signal thereto is not a digital signal, the input audio signal is converted into a digital signal. After the front head related transfer function is convoluted therein, the input audio signal is reset to an analog signal and outputted.

Figure 15:
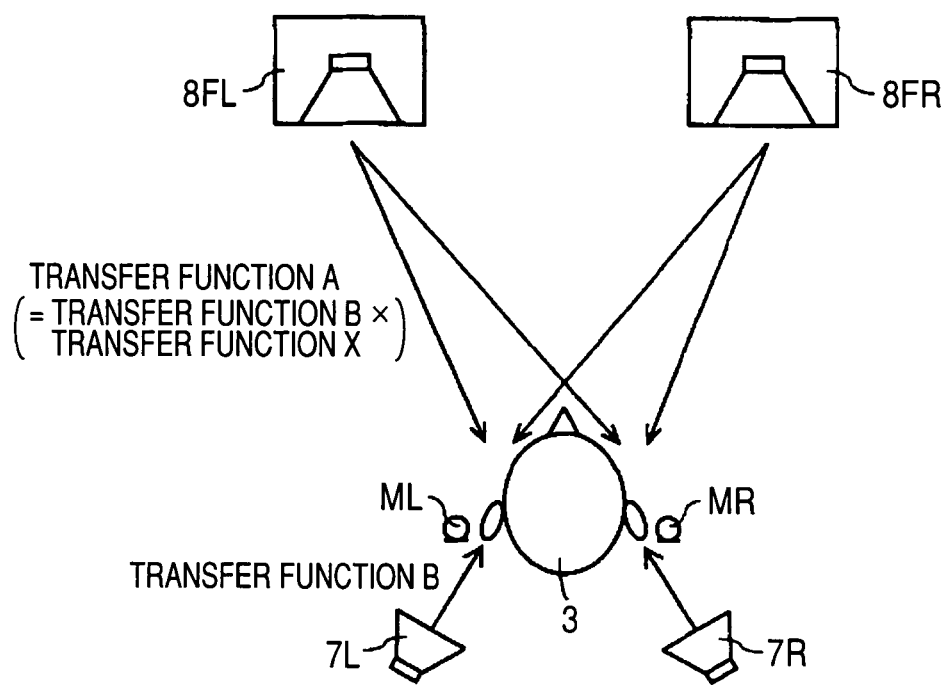
FIG. 15 is a diagram for explaining the structure of a part of the audio-signal output device unit shown in FIG. 9.

In this example, the front head related transfer function is measured as described below and stored in the front-head-related-transfer-function storing unit 112. FIG. 15 is a diagram for explaining a method of measuring the front head related transfer function.

As shown in FIG. 15, the microphone ML for left channel measurement and the microphone MR for right channel measurement are set near both the left and right ears of the listener 3. A speaker 8FL for a front left channel is set in a place in front of the listener 3 where a speaker for the front left channel is usually arranged. For example, emitted sound emitted when impulse is reproduced by the speaker 8FL for the front left channel is collected by the respective microphones ML and MR. A transfer function for transfer from the front speaker 8FL to the left and right ears (a front head related transfer function for the front left channel) is measured from an audio signal of the collected sound.

In the same manner, for example, emitted sound emitted when impulse is reproduced by a speaker 8FR for a front right channel is collected by the respective microphones ML and MR. A transfer function for transfer from the front speaker 8FR to the left and right ears (a front head related transfer function for the front right channel) is measured from an audio signal of the collected sound.

It is advisable that, when the front speakers 8FL and 8FR are set in positions at an angle of 30 degrees and a distance of 2 m to the left and right from the center in front of the listener 3, a transfer function for transfer from the respective speakers to the ears is measured and the measured transfer function is applied as the front head related transfer function.

Explanation of the transfer function is further supplemented below. For example, in FIG. 15, a transfer function for transfer from left in front to the left ear is represented as a transfer function A. A transfer function obtained by measuring a transfer function for transfer from, for example, the speakers 7L and 7R near the ears to the microphone ML is represented as a transfer function B. A transfer function X, with which the transfer function B is multiplied to obtain the transfer function A, is calculated. The calculated transfer function X is convoluted in signal sound sent to the speaker 7L near the ears. Then, the listener 3 feels as if sound emitted from the speaker 7L at that point is sound traveling from a position 2 m left in front of the listener 3.

However, the transfer function X does not always have to be calculated. In some case, only the transfer function A has to be calculated. One transfer function is explained above as a representative transfer function. However, it goes without saying that, as shown in FIG. 15, actually, there are plural transfer functions.

The front head related transfer function measured as described above is stored in the front-head-related-transfer-function storing unit 112, supplied to the front-transfer-function convolution circuit 220 through the input and output port 109, and convoluted in the front-transfer-function convolution circuit 220.

An audio signal obtained by combining the audio signal C in the center channel with the audio signal FL* in the front left channel subjected to the virtual sound source processing and an audio signal obtained by combining the audio signal C in the center channel with the audio signal FR* in the front right channel subjected to the virtual sound source processing are obtained from the front-transfer-function convolution circuit 220.

Referring back to FIG. 9, the audio signals (FL*+C) and (FR*+C) from the front-transfer-function convolution circuit 220 are supplied to the speakers 7LA and 7RA or 7LB and 7RB arranged near both the ears of the listener 3A or 3B and reproduced. In this case, the listener 3A or 3B listens to reproduced sound as if the reproduced sound is emitted from the front speakers 8FL and 8FR in the front left and right and listens to center channel sound as if the center channel sound is emitted from the speaker set in the center.

Levels of the audio signals (FL*+C) and (FR*+C) at this point may be lower than levels of signals supplied to the speakers 8FL and 8FR. This is because the speakers 7LA and 7RA or 7LB and 7RB are near the ears of the listener 3A or 3B.

In this way, the audio signals (FL*+C) and (FR*+C) from the front-transfer-function convolution circuit 220 subjected to the virtual sound source processing are supplied to combining units 213 and 214. The low-frequency audio signal LFE from the 5.1-channel decoding unit 202 is supplied to the combining units 213 and 214. Output audio signals of the combining units 213 and 214 are supplied to the combining units 211 and 212.

The audio signal in the front left channel, with which the audio signal in the center channel is combined, subjected to the virtual sound source processing from the front-transfer-function convolution circuit 220 is combined with the low-frequency audio signal LFE from the 5.1-channel decoding unit 202 in the combining unit 213. Then, in the combining unit 211, the audio signal is combined with the audio signal in the rear left channel subjected to the virtual sound source processing from the rear-transfer-function convolution circuit 210 to be a signal L* for the left channel.

In the same manner, the audio signal in the front right channel, with which the audio signal in the center channel is combined, subjected to the virtual sound source processing from the front-transfer-function convolution circuit 220 is combined with the low-frequency audio signal LFE from the 5.1-channel decoding unit 202 in the combining unit 214. Then, in the combining unit 212, the audio signal is combined with the audio signal in the rear right channel subjected to the virtual sound source processing from the rear-transfer-function convolution circuit 210 to be a signal R* for the right channel.

The combined audio signals L* and R* from the combining units 211 and 212 are supplied to a multiplexing unit 215 and multiplexed and transmitted from a radio transmission unit 216 to audio-signal receiving and distributing units 50A and 50B by radio.

Each of the audio-signal receiving and distributing units 50A and 50B receives a radio wave from the audio-signal output device unit 40, extracts the multiplexed audio signal from the received radio wave, de-multiplexes the audio signal, and separates the audio signals L* and R* for the left and right two channels. The audio-signal receiving and distributing unit generates, from the audio signals L* and R* for the left and right two channels, signals SLA and SLB to be supplied to the speakers 5A and 5B for low frequencies and signals SHLA and SHRA and signals SHLB and SHRB supplied to the speakers 7LA and 7RA and the speakers 7LB and 7RB for medium and high frequencies and supplies the signals to the speakers 5A and 5B corresponding to the signals, respectively.

Therefore, the speakers 5A and 5B mainly reproduce the low-frequency audio signal LFE. The speakers 7LA and 7RA and the speakers 7LB and 7RB reproduces the front audio signals (FL*+C) and (FR*+C) subjected to the virtual sound source processing and the rear audio signals RL* and RR* subjected to the virtual sound source processing.

When audio signals in the left and right two channels from the CD player 70 are outputted from the switch circuit 201 or when an audio signal from the DVD players 60 is an audio signal in the left and right two channels, only the audio signals L and R in the left and right two channels are outputted from the 5.1-channel decoding unit 202 and supplied to the front-transfer-function convolution circuit 220. The front transfer function is convoluted in the audio signals and the audio signals are subjected to the virtual sound source processing. At this point, the rear-transfer-function convolution circuit 210 is not turned on and not actuated.

Signals in the two channels from the front-transfer-function convolution circuit 220 are supplied to the audio-signal receiving and distributing units 50A and 50B by the multiplexing unit 215 and the radio transmission unit 216 through the combining units 213, 214, 211, and 212.

Therefore, at this point, audio signals obtained by subjecting the audio signals in the left and right front channels to the virtual sound source processing are reproduced in the speakers 5A, 7LA, and 7RA or the speakers 5B, 7LB, and 7RB as if reproduced sound is emitted from the front speakers placed on the left and right in front of the listener 3A or 3B.

In this way, in the third embodiment, the listener 3A or 3B can enjoy realistic multi-channel sound at large volume using only the three speakers near both the ears of the listener 3A or 3B and behind the listener 3A or 3B. Further, it is possible to substantially reduce leakage of sound to the neighborhood and realize energy saving for the audio reproduction system.

Reproduced sound fields are provided to the respective listeners 3A and 3B. Therefore, there is an effect that, unlike reproduced sound fields provided by speakers fixedly set in a dashboard, doors, and the like of an automobile, audio image localization does not change depending on positions of listeners and optimum reproduced sound fields can be typically provided to the respective listeners.

As explained in the first embodiment as well, since acoustic power in the three speakers 5, 7L, and 7R behind the head of the listener can be substantially reduced compared with that in arranging speakers in doors and the like in a vehicle-mounted audio system in the past, there is also an advantage that a load on a battery can be reduced.

Example of the structure of the audio-signal receiving and distributing units

The audio-signal receiving and distributing units 50A and 50B generate signals for audio reproduction described above. Besides, the audio-signal receiving and distributing units 50A and 50B also generate noise reduction audio signals supplied to the speakers 5A and 5B for noise reduction and for low frequencies and supply the noise reduction audio signals to the speakers 5A and 5B.

Figure 16:
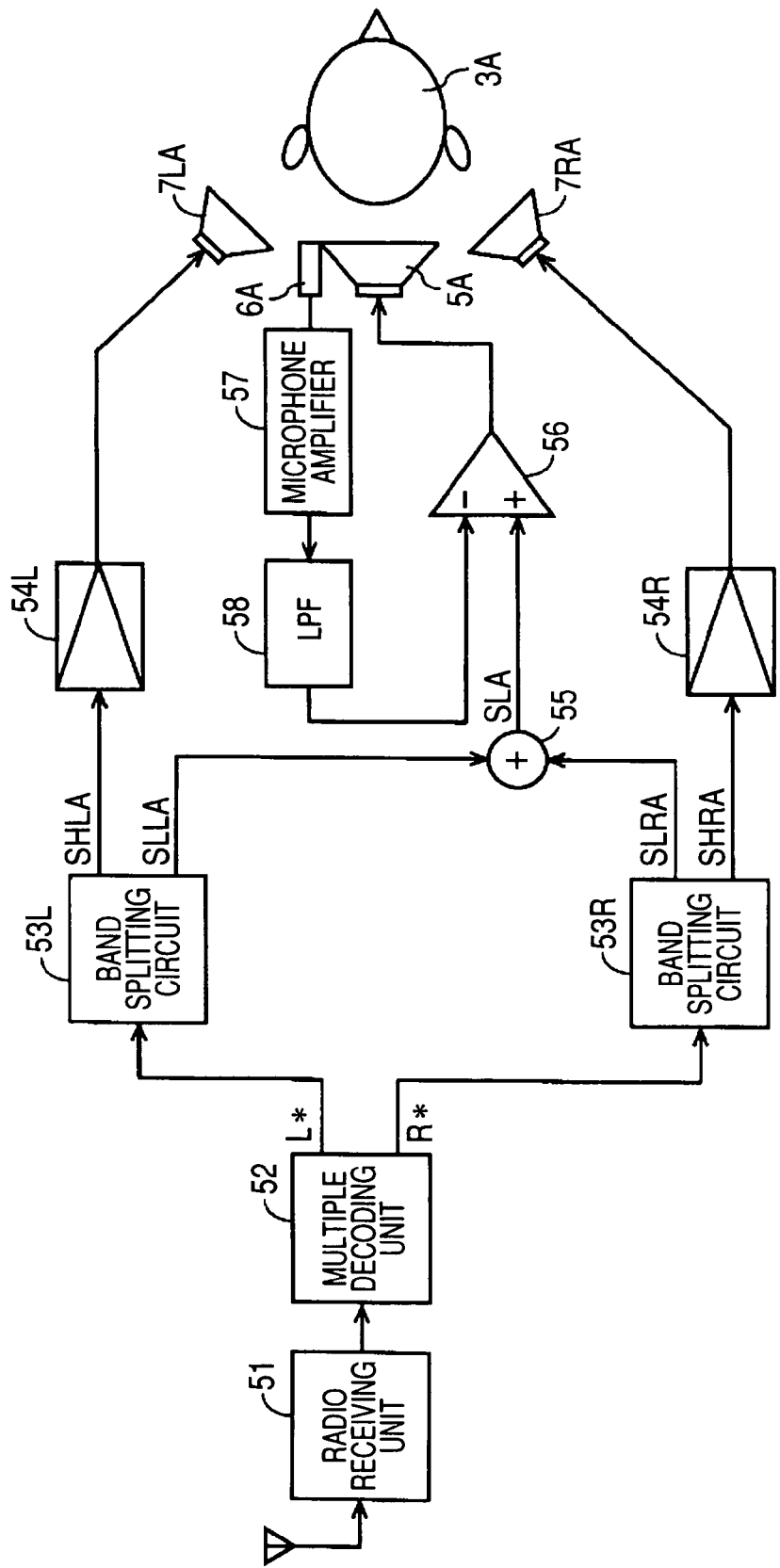
FIG. 16 is a block diagram showing an example of the structure of an audio-signal receiving and distributing unit in the audio reproduction apparatus according to the third embodiment shown in FIG. 9.

The audio-signal receiving and distributing units 50A and 50B have the identical structure. An example of the structure of the audio-signal receiving and distributing unit 50A according to this embodiment is shown in FIG. 16. In the example shown in FIG. 16, as in the second embodiment, a filter circuit is not provided.

In this example, a signal transmitted from the audio-signal output device unit 40 by radio is received by the radio receiving unit 51 and supplied to a multiple decoding unit 52. In the multiple decoding unit 52, an audio signal multiplexed in the received signal is subjected to de-multiplex processing and the signals L* and R* in the two channels are decoded.

The signals L* and R* in the two channels from the multiple decoding unit 52 are supplied to band splitting circuits 53L and 53R, respectively. The band splitting circuits 53L and 53R respectively separate the inputted signals L* and R* into low-frequency components SLLA and SLRA and medium-and high-frequency components SHLA and SHRA. For example, frequency components lower than 200 Hz are set as low-frequency components and frequency components higher than 200 Hz are set as high-frequency components. This separation frequency is not limited to 200 Hz and may be, for example, 100 Hz.

The medium-and high-frequency component SHLA in the left channel from the band splitting circuit 53L is supplied to the speaker 7LA through an amplifier 54L. The medium-and high-frequency component SHRA in the right channel from the band splitting circuit 53R is supplied to the speaker 7RA through an amplifier 54R.

The low-frequency components SLLA and SLRA from the band splitting circuit 53L and the band splitting circuit 53R are supplied to a combiner 55 and combined. A combined output signal SLA of the low-frequency components is supplied to the speaker 5A through a differential amplifier 56 serving as a power amplifier.

Therefore, the speaker 5A serving as a subwoofer mainly reproduces the low-frequency audio signal LFE. The speakers 7L and 7R reproduce the medium-and high-frequency audio signals in the rear left and right channels subjected to the virtual sound source processing.

In this embodiment, an audio signal of the external noise Nz collected by the microphone 6A is supplied to a low-pass filter 58 through a microphone amplifier 57 to be limited to only low-frequency components with a frequency, for example, equal to or lower than 200 Hz.

The low-frequency components of the noise Nz from the low-pass filter 58 are supplied to an inversion input terminal of the differential amplifier 56 that forms a power amplifier. Therefore, a noise reduction audio signal obtained by phase-inverting the low-frequency components of the noise Nz from the low-pass filter 58 is obtained from the differential amplifier 56 and supplied to the speaker 5A.

Consequently, noise reduction sound is emitted from the speaker 5A and acoustically combined with the external noise Nz. As in the first and second embodiments, the external noise Nz near the ears of the listener 3A is reduced or cancelled.

As described above, with the audio reproduction system according to the third embodiment, the listeners 3A and 3B sitting on the seats can enjoy realistic multi-channel sound at large volume using speakers smaller in number than the number of channels. In addition, it is possible to substantially reduce sound leakage to the neighborhood.

Moreover, in a state in which engine noise and tire noise are reduced or cancelled, it is possible to enjoy multi-channel sound and obtain comfortable sound fields.

In particular, in this embodiment, since the speaker 5 for bass reproduction is not housed in a speaker box and is arranged near the listener 3 and near the ears behind the head, it is possible to substantially attenuate leakage of heavy bass to adjacent rooms. As described above, since the sound in the rear left and right channels is emitted as sound subjected to the virtual sound source processing by the speakers 7L and 7R near the ears of the listener 3, it is possible to reduce an audio signal level of the sound. Therefore, it is possible to further reduce not only leakage of bass but also levels of leakage of sound to the neighborhood. Consequently, it is possible to even enjoy, for example, DVD entertainment late at night at sufficient volume without worrying about others.

Since the speakers 5, 7L, and 7R are arranged near the ears of the listener, in an extreme case, audio signal output power can be set to about 1/100 of that in the past. Therefore, it is possible to save energy and substantially reduce cost of hardware (output amplifiers). There is also an advantage that, since only small power is necessary as audio output power, thin, light, and inexpensive speakers that do not need a large stroke can be used. Since the audio output power is reduced, heat generation decreases and a reduction in sizes of devices such as a power supply can also be performed. Therefore, battery driving of the speakers is also possible and the speakers can be embedded in a design of a chair and the like.

Therefore, it is possible to realize energy saving for the audio reproduction system as a whole. There is an advantage that it is possible to provide an audio reproduction system that reduces noise to the neighborhood without deteriorating a degree of satisfaction of a person who enjoys sound.

In the configuration shown in FIG. 9, the audio-signal receiving and distributing unit is provided for each of the listeners. However, the audio-signal receiving and distributing unit can be common to plural listeners. However, in that case, output audio signals (external noise audio signals) of respective microphones provided in a sound pressure zero area with respect to emitted sound from speakers for emitting noise reduction sound arranged behind the respective listeners are supplied to the common audio-signal receiving and distributing unit.

Noise reduction audio signals in audio signals supplied to the speakers 5 for noise reduction and for low frequencies of the respective listeners need to be noise reduction audio signals obtained by phase-inverting audio signals collected by microphones corresponding thereto. Therefore, the audio signals supplied to the speakers 5 for noise reduction and for low frequencies of the respective listeners need to be separately generated and supplied to the audio signals supplied to the speakers 5 corresponding thereto, respectively.

On the other hand, as signals in the two channels for medium and high frequencies, the same signal generated in common in the common audio-signal receiving and distributing unit can be respectively supplied to the speakers 7L and 7R arranged behind near the heads of the respective listeners in common as a signal for the plural listeners.

It goes without saying that, without providing the audio-signal receiving and distributing units 50A and 50B and the like, the audio-signal output device unit 40 may have a function of the audio-signal receiving and distributing unit and supply audio signals corresponding to the speakers 5, 7L, and 7R for the respective listeners to the speakers through a speaker cable.

In the third embodiment, audio signals in all channels of multi-surround sound are subjected to the virtual sound source processing and supplied to the three speakers near the listener 3 and behind the head. However, for example, it is also possible that sounds in the left and right front channels are reproduced by speakers attached to a dashboard and doors of an automobile and audio signals obtained by subjecting an audio signal in the rear channel to the virtual sound source processing are reproduced by the three speakers behind the head.

Further, it is also possible that audio signals in all the channels in the 5.1 channel are subjected to the virtual sound source processing and reproduced by the three speakers behind the head and the center channel, in which localization is relatively difficult, is supplementarily provided by the speakers fixedly set in the dashboard, the doors, and the like of the automobile.

Other Embodiments and Modifications

Arrangement positions of the speaker for noise reduction and for low frequencies and the two speakers for medium and high frequencies in the third embodiment are not limited to the arrangement positions in the embodiments described above.

Figure 17A:
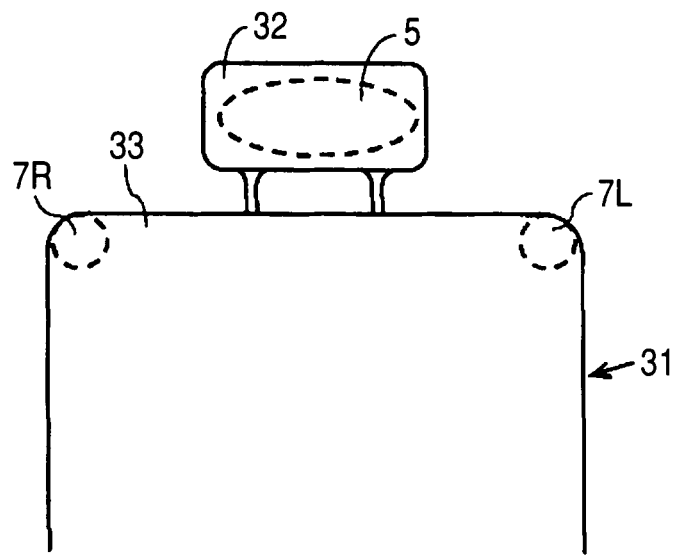
FIGS. 17A and 17B are diagrams showing an example of an arrangement of a speaker and a microphone for external noise collection in an audio reproduction apparatus including a noise reduction apparatus according to an embodiment of the present invention.
Figure 17B:
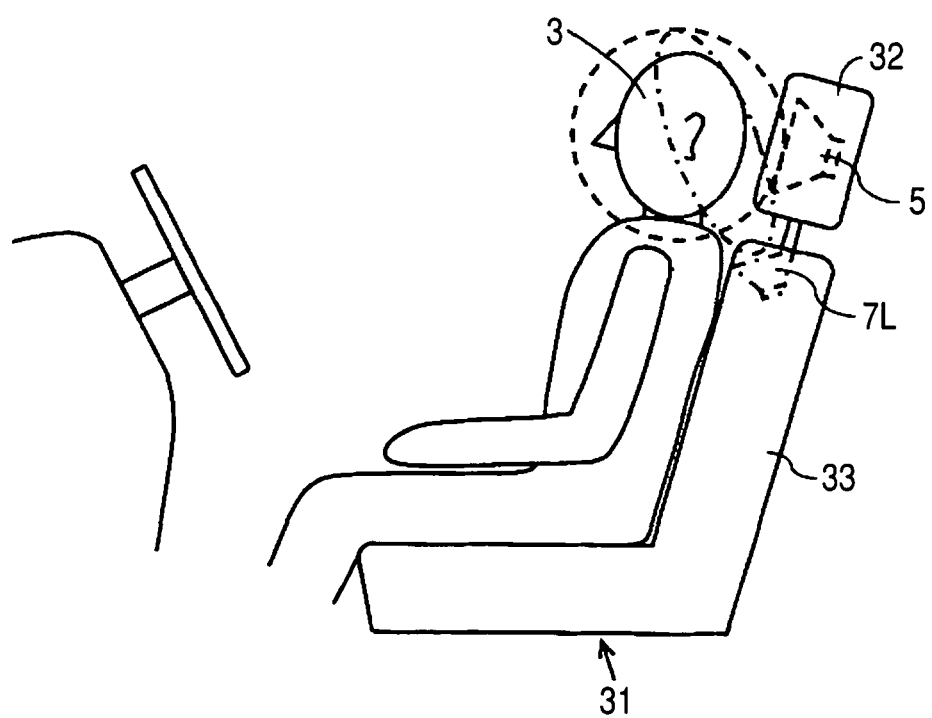

For example, an example of arrangement positions of the speakers shown in FIGS. 17A and 17B is also possible. In the example shown in FIGS. 17A and 17B, the speaker 5 for low frequencies is attached in the headrest 32 without being attached to a baffle plate. As shown in FIG. 17A, the speakers 7L and 7R for medium and high frequencies are attached to both left and right shoulder sections at the top of a chair back 33 of a seat 31 without being attached to baffle plates. In this case, it is advisable that, as shown in FIG. 17B, the speakers 7L and 7R for medium and high frequencies are attached such that directions of the ears of the listener 3 are in emitting directions of sound waves.

Figure 18:
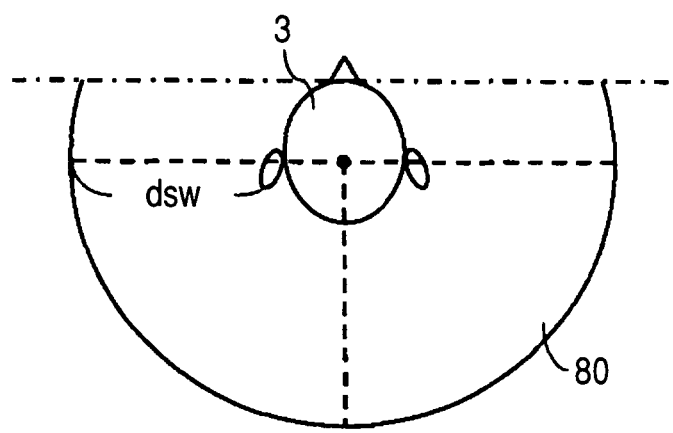
FIG. 18 is a diagram showing another example of an arrangement of the speaker and the microphone for external noise collection in the audio reproduction apparatus including the noise reduction apparatus according to the embodiment of the present invention.

In the audio reproduction apparatus according to the embodiments explained above, arrangement positions of the speakers 1, 1L, and 1R or the speakers 5, 7L, and 7R are not limited to the arrangements in the embodiments. For example, as shown in FIG. 18, the arrangement positions may be any positions as long as the positions are on a spherical surface 80 with a radius of, for example, (dsw+radius of the head of the listener 3) around the head of the listener 3. However, it is desirable that, as shown in FIG. 18, the arrangement positions of the speakers are within a section further on the rear side than the face of the listener 3.

However, arrangement positions of the speakers 1, 1L, and 1R in the noise reduction apparatus according to the embodiments do not have to be within the section further on the rear side than the face of the listener 3 as shown in FIG. 1B.

In the embodiments described above, the speaker for noise reduction and for low frequencies and the speakers for medium and high frequencies are fixed and attached to the chair. However, a method of holding these speakers is not limited to this. For example, each of the speakers may be held in a form of a stand placed on a floor or may be suspended from a ceiling.

In the embodiments described above, the microphone for external noise collection is attached to the frame of the speaker for emitting noise reduction sound. However, the microphone can be held, rather than being held by the frame of the speaker, in a sound pressure zero area with respect to emitted sound from the speaker for emitting noise reduction sound by predetermined holding means such as a stand or a holding arm.

In the explanation of the embodiments, the audio reproduction system that reproduces the multi-channel audio signal in the 5.1 channel is explained. However, the present invention is applicable to all audio reproduction systems that reproduce audio signals in not only the 5.1 channel but also two or more channels.

In the above explanation, engine noise and tire noise of the automobile are explained as noise sources. However, the present invention is not limited to the noise reduction apparatus for automobiles. For example, when a reclining seat on which a listener sits is assumed instead of a seat of an automobile, noise reduction in environmental spaces such as a space in an airplane and a living room of a house can be an object of the present invention.

Since the speaker holding means is not limited to a chair as described above, noise reduction in other various noise environments is an object of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A noise reduction apparatus comprising:
   a speaker with a speaker unit held by holding means, the speaker configured as a bare speaker in which the speaker unit is not housed in a speaker box and is not attached to a baffle plate, to enable mixing a first sound emitted from a first side of a vibration plate of the speaker with a second sound emitted from a second side of the vibration plate of the speaker;
   a microphone provided in an area where the mixing of the first and second sounds results in cancellation of each of the first and second sounds; and
   means for supplying to the speaker a noise reduction audio signal, wherein the noise reduction audio signal is obtained by phase-inverting a noise audio signal collected by the microphone and performing correction based on a space transfer function between a first position of a source of a noise sound and a second position where the noise sound is to be reduced.

2. A noise reduction apparatus according to claim 1, further comprising a low-pass filter for limiting the noise reduction audio signal to low-frequency components of the noise audio signal collected by the microphone.

3. A noise reduction apparatus according to claim 1, wherein a predetermined audio signal is supplied to the speaker in addition to the noise reduction audio signal.

4. A noise reduction apparatus according to claim 3, wherein the speaker is held by the holding means to be arranged near an ear of a listener.

5. A noise reduction apparatus comprising:
   a speaker with a speaker unit held by a holding unit, the speaker configured as a bare speaker in which the speaker unit is not housed in a speaker box and is not attached to a baffle plate, to enable mixing a first sound emitted from a first side of a vibration plate of the speaker with a second sound emitted from a second side of the vibration plate of the speaker;
   a microphone provided in an area where the mixing of the first and second sounds results in cancellation of each of the first and second sounds; and
   a unit configured to supply to the speaker a noise reduction audio signal, wherein the noise reduction audio signal is obtained by phase-inverting a noise audio signal collected by the microphone and performing correction based on a space transfer function between a first position of a source of a noise sound and a second position where the noise sound is to be reduced.

6. A noise reduction apparatus according to claim 5, wherein the noise reduction audio signal comprises frequency components smaller than a threshold frequency.

7. A noise reduction apparatus according to claim 5, wherein a predetermined audio signal is supplied to the speaker in addition to the noise reduction audio signal.

8. A noise reduction apparatus according to claim 5, wherein the speaker is held by the holding unit to be arranged near an ear of a listener.

9. A noise reduction apparatus according to claim 1, wherein the first sound is associated with a first sound wave having a first phase and the second sound is associated with a second sound wave having a second phase, and the first phase is opposite to the second phase.

10. A noise reduction apparatus according to claim 5, wherein the first sound is associated with a first sound wave having a first phase and the second sound is associated with a second sound wave having a second phase, and the first phase is opposite to the second phase.

11. A noise reduction method comprising:
    reproducing noise reduction sounds using a speaker with a speaker unit held by holding means;
    mixing a first sound emitted from a first side of a vibration plate of the speaker with a second sound emitted from a second side of the vibration plate of the speaker;
    cancelling each of the first and second sounds in an area of reduced sound pressure;
    collecting noise audio sounds using a microphone that is provided in the area of reduced sound pressure; and
    supplying to the speaker a noise reduction audio signal, wherein the noise reduction audio signal is obtained by phase-inverting a noise audio signal corresponding to the noise audio sounds collected by the microphone and performing correction based on a space transfer function between a first position of a source of a noise sound and a second position where the noise sound is to be reduced.

12. A noise reduction method according to claim 11, further comprising:
    determining the area of reduced sound pressure by collecting a sound wave emitted from the speaker and testing whether a sound pressure is substantially zero.

* * * * *